United States Patent
Gallo et al.

(10) Patent No.: US 9,693,386 B2
(45) Date of Patent: Jun. 27, 2017

(54) TIME CHART FOR SENSOR BASED DETECTION SYSTEM

(71) Applicants: Allied Telesis Holdings Kabushiki Kaisha, Tokyo (JP); ALLIED TELESIS, INC., Bothell, WA (US)

(72) Inventors: Joseph L. Gallo, Santa Cruz, CA (US); Ferdinand E. K. de Antoni, Manila (PH); Scott Gill, Makati (PH); Daniel Stellick, Geneva, IL (US)

(73) Assignee: ALLIED TELESIS HOLDINGS KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/637,835

(22) Filed: Mar. 4, 2015

(65) Prior Publication Data
US 2015/0341981 A1    Nov. 26, 2015

Related U.S. Application Data

(63) Continuation-in-part of application No. 14/281,896, filed on May 20, 2014, now abandoned, and a
(Continued)

(51) Int. Cl.
*G08B 17/12*    (2006.01)
*H04W 84/18*    (2009.01)
(Continued)

(52) U.S. Cl.
CPC .......... *H04W 84/18* (2013.01); *G06F 3/0482* (2013.01); *G06F 3/0484* (2013.01);
(Continued)

(58) Field of Classification Search
None
See application file for complete search history.

(56) References Cited

U.S. PATENT DOCUMENTS

| 4,970,391 A | 11/1990 | Uber, III |
| 6,642,843 B2 | 11/2003 | Satoh |

(Continued)

FOREIGN PATENT DOCUMENTS

| JP | 2007085755 A | 4/2007 |
| KR | 1020070028813 A | 3/2007 |

(Continued)

OTHER PUBLICATIONS

Department of Climate Change and Energy Efficiency, National Greenhouse and Energy Reporting System Measurement: Technical Guidelines for the Estimation of Greenhouse Gas Emissions by Facilities in Australia (Department of Climate Change and Energy Efficiency, 2012).

(Continued)

*Primary Examiner* — Julie Lieu
(74) *Attorney, Agent, or Firm* — Brooks Acordia IP Law, P.C.; Michael Zarrabian

(57) ABSTRACT

Some embodiments provide a system that includes a sensor management module and a visualization module. The sensor management module may be configured to manage a plurality of sensors. The plurality of sensors may be configured to measure values associated with inputs therein. The visualization module may be configured to provide a graphical user interface (GUI) that includes a time chart tool for selecting a time period associated with a sensor of the plurality of sensors. The visualization module may be further configured to create an event with a start time based on the time period associated with the sensor.

5 Claims, 21 Drawing Sheets

Related U.S. Application Data continuation-in-part of application No. 14/281,901, filed on May 20, 2014, and a continuation-in-part of application No. 14/281,904, filed on May 20, 2014, and a continuation-in-part of application No. 14/284,009, filed on May 21, 2014, and a continuation-in-part of application No. 14/315,286, filed on Jun. 25, 2014, and a continuation-in-part of application No. 14/315,289, filed on Jun. 25, 2014, and a continuation-in-part of application No. 14/315,317, filed on Jun. 25, 2014, and a continuation-in-part of application No. 14/315,320, filed on Jun. 25, 2014, and a continuation-in-part of application No. 14/315,322, filed on Jun. 25, 2014, and a continuation-in-part of application No. 14/336,994, filed on Jul. 21, 2014, and a continuation-in-part of application No. 14/337,012, filed on Jul. 21, 2014, and a continuation-in-part of application No. 14/488,229, filed on Sep. 16, 2014, and a continuation-in-part of application No. 14/604,472, filed on Jan. 23, 2015, and a continuation-in-part of application No. 14/637,168, filed on Mar. 3, 2015, and a continuation-in-part of application No. 14/637,181, filed on Mar. 3, 2015.

(51) Int. Cl.
  *G06F 3/0482* (2013.01)
  *G06F 3/0484* (2013.01)
  *G08B 31/00* (2006.01)
  *G08B 21/10* (2006.01)

(52) U.S. Cl.
  CPC ......... *G06F 3/04842* (2013.01); *G08B 21/10* (2013.01); *G08B 31/00* (2013.01)

(56) References Cited

U.S. PATENT DOCUMENTS

| | | | |
|---|---|---|---|
| 6,686,838 B1 | 2/2004 | Rezvani | |
| 7,030,752 B2 | 4/2006 | Tyroler | |
| 7,091,854 B1 | 8/2006 | Miao | |
| 7,555,412 B2 | 6/2009 | Nath et al. | |
| 8,575,560 B1 | 11/2013 | Fechner | |
| 8,732,592 B2 | 5/2014 | Nielsen | |
| 2003/0058095 A1 | 3/2003 | Satoh | |
| 2003/0107650 A1 | 6/2003 | Colmenarez et al. | |
| 2004/0164859 A1 | 8/2004 | La Spisa | |
| 2005/0248454 A1 | 11/2005 | Hanson et al. | |
| 2006/0047419 A1 | 3/2006 | Diendorf et al. | |
| 2006/0097171 A1 | 5/2006 | Balchunas et al. | |
| 2007/0044539 A1 | 3/2007 | Sabol | |
| 2007/0195712 A1 | 8/2007 | Thayer et al. | |
| 2007/0222585 A1 | 9/2007 | Sabol | |
| 2007/0265866 A1 | 11/2007 | Fehling et al. | |
| 2008/0036585 A1 | 2/2008 | Gould | |
| 2008/0191871 A1 | 8/2008 | Horak | |
| 2008/0249791 A1 | 10/2008 | Iyer | |
| 2008/0271143 A1 | 10/2008 | Stephens et al. | |
| 2009/0006589 A1 | 1/2009 | Forbes et al. | |
| 2009/0033487 A1 | 2/2009 | McFadden et al. | |
| 2009/0236538 A1 | 9/2009 | Frank | |
| 2010/0274592 A1* | 10/2010 | Nitzan | G06F 19/3437 705/3 |
| 2011/0074596 A1 | 3/2011 | Frohlick et al. | |
| 2011/0148905 A1* | 6/2011 | Simmons | A61B 5/14532 345/589 |
| 2011/0153655 A1 | 6/2011 | Kim et al. | |
| 2011/0161885 A1 | 6/2011 | Gonia | |
| 2011/0193704 A1* | 8/2011 | Harper | A61B 5/14532 340/573.1 |
| 2012/0001754 A1 | 1/2012 | Kraus et al. | |
| 2012/0002733 A1 | 1/2012 | Misra | |
| 2012/0042326 A1 | 2/2012 | Jain et al. | |
| 2012/0150783 A1 | 6/2012 | Jung et al. | |
| 2012/0197911 A1 | 8/2012 | Banka et al. | |
| 2012/0212574 A1 | 8/2012 | Blumenfeld | |
| 2012/0280798 A1 | 11/2012 | Li | |
| 2012/0313779 A1 | 12/2012 | Papaefstathiou | |
| 2012/0323623 A1 | 12/2012 | Sabharwal | |
| 2013/0009780 A1 | 1/2013 | Marshall et al. | |
| 2013/0124597 A1 | 5/2013 | Diao et al. | |
| 2013/0184031 A1 | 7/2013 | Pollington et al. | |
| 2013/0262349 A1* | 10/2013 | Bouqata | G06N 99/005 706/12 |
| 2013/0304385 A1 | 11/2013 | Gillette, II | |
| 2013/0338465 A1* | 12/2013 | Taub | A61B 5/14532 600/365 |
| 2014/0028457 A1 | 1/2014 | Reinpoldt et al. | |
| 2014/0074982 A1 | 3/2014 | Misra | |
| 2014/0118123 A1 | 5/2014 | Lim et al. | |
| 2014/0266793 A1 | 9/2014 | Velado | |
| 2014/0278646 A1 | 9/2014 | Adrian et al. | |
| 2014/0280319 A1 | 9/2014 | Rishe | |
| 2014/0287782 A1 | 9/2014 | Davis | |
| 2014/0347186 A1* | 11/2014 | Harper | A61B 5/14532 340/573.1 |
| 2015/0178657 A1 | 6/2015 | Kleehammer et al. | |
| 2015/0189005 A1 | 7/2015 | Dubois | |
| 2015/0192682 A1 | 7/2015 | Valentino | |
| 2015/0213631 A1* | 7/2015 | Vander Broek | G06T 11/206 345/589 |
| 2015/0213703 A1 | 7/2015 | Filson | |
| 2015/0248275 A1 | 9/2015 | Gallo | |

FOREIGN PATENT DOCUMENTS

| | | |
|---|---|---|
| KR | 100900937 B1 | 6/2009 |
| KR | 1020110053145 A | 5/2011 |
| KR | 1020130038549 A | 4/2013 |
| KR | 1020130115445 A | 10/2013 |

OTHER PUBLICATIONS

Gunther Schadow et al., The Unified Code for Units of Measure, (2009) http://web.archive.org/web/20130116071912/http://unitsofmeasure.org/ucum.html.

International Search Report for serial No. PCT/US2015/031632 mailed Aug. 27, 2015.

International Search Report for serial No. PCT/US2015/031644 mailed Aug. 27, 2015.

International Search Report for serial No. PCT/US2015/031825 mailed Aug. 11, 2015.

International Search Report for serial No. PCT/US2015/031835 mailed Aug. 26, 2015.

\* cited by examiner

TIME CHART FOR SENSOR BASED DETECTION SYSTEM

RELATED APPLICATIONS

This application is a continuation in part of the U.S. patent application Ser. No. 14/281,896 entitled "SENSOR BASED DETECTION SYSTEM", by Joseph L. Gallo et al., filed on 20 May 2014, which is incorporated by reference herein.

This application is a continuation in part of the U.S. patent application Ser. No. 14/281,901 entitled "SENSOR MANAGEMENT AND SENSOR ANALYTICS SYSTEM", by Joseph L. Gallo et al., filed on 20 May 2014, which is incorporated by reference herein.

This application is a continuation in part of the U.S. patent application Ser. No. 14/315,286 entitled "METHOD AND SYSTEM FOR REPRESENTING SENSOR ASSOCIATED DATA", by Joseph L. Gallo et al., filed on 25 Jun. 2014, which is incorporated by reference herein.

This application is a continuation in part of the U.S. patent application Ser. No. 14/315,289 entitled "METHOD AND SYSTEM FOR SENSOR BASED MESSAGING", by Joseph L. Gallo et al., filed on 25 Jun. 2014, which is incorporated by reference herein.

This application is a continuation in part of the U.S. patent application Ser. No. 14/604,472 entitled "ALERT SYSTEM FOR SENSOR BASED DETECTION SYSTEM", by Joseph L. Gallo et al., filed on 23 Jan. 2015, which is incorporated by reference herein.

This application is a continuation in part of the U.S. patent application Ser. No. 14/315,317 entitled "PATH DETERMINATION OF A SENSOR BASED DETECTION SYSTEM", by Joseph L. Gallo et al., filed on 25 Jun. 2014, which is incorporated by reference herein.

This application is a continuation in part of the U.S. patent application Ser. No. 14/315,320 entitled "GRAPHICAL USER INTERFACE OF A SENSOR BASED DETECTION SYSTEM", by Joseph L. Gallo et al., filed on 25 Jun. 2014, which is incorporated by reference herein.

This application is a continuation in part of the U.S. patent application Ser. No. 14/315,322 entitled "GRAPHICAL USER INTERFACE FOR PATH DETERMINATION OF A SENSOR BASED DETECTION SYSTEM", by Joseph L. Gallo et al., filed on 25 Jun. 2014, which is incorporated by reference herein.

This application is a continuation in part of the U.S. patent application Ser. No. 14/637,168 entitled "GRAPHICAL USER INTERFACE AND VIDEO FRAMES FOR A SENSOR BASED DETECTION SYSTEM", by Joseph L. Gallo et al., filed on 3 Mar. 2015, which is incorporated by reference herein.

This application is a continuation in part of the U.S. patent application Ser. No. 14/281,904 entitled "EVENT MANAGEMENT FOR A SENSOR BASED DETECTION SYSTEM", by Joseph L. Gallo et al., filed on 20 May 2014, which is incorporated by reference herein.

This application is a continuation in part of the U.S. patent application Ser. No. 14/336,994 entitled "SENSOR GROUPING FOR A SENSOR BASED DETECTION SYSTEM", by Joseph L. Gallo et al., filed on 21 Jul. 2014, which is incorporated by reference herein.

This application is a continuation in part of the U.S. patent application Ser. No. 14/337,012 entitled "DATA STRUCTURE FOR A SENSOR BASED DETECTION SYSTEM", by Joseph L. Gallo et al., filed on 21 Jul. 2014, which is incorporated by reference herein.

This application is a continuation in part of the U.S. patent application Ser. No. 14/488,229 entitled "SENSOR ASSOCIATED DATA PROCESSING CUSTOMIZATION", by Joseph L. Gallo et al., filed on 16 Sep. 2014, which is incorporated by reference herein.

This application is a continuation in part of the U.S. patent application Ser. No. 14/637,181 entitled "PLAYBACK DEVICE FOR A SENSOR BASED DETECTION SYSTEM", by Joseph L. Gallo et al., filed on 3 Mar. 2015, which is incorporated by reference herein.

This application is a continuation in part of the U.S. patent application Ser. No. 14/284,009 entitled "USER QUERY AND GAUGE-READING RELATIONSHIPS", by Ferdinand E. K. de Antoni et al., filed on 21 May 2014, which is incorporated by reference herein.

This application claims the benefit to Philippines Patent Application No. 1/2013/000136 entitled "A DOMAIN AGNOSTIC METHOD AND SYSTEM FOR THE CAPTURE, STORAGE, AND ANALYSIS OF SENSOR READINGS", by Ferdinand E. K. de Antoni, filed on 23 May 2013, which is incorporated by reference herein.

BACKGROUND

As technology has advanced, computing technology has proliferated to an increasing number of areas while decreasing in price. Consequently, devices such as smartphones, laptops, GPS, etc., have become prevalent in our community, thereby increasing the amount of data being gathered in an ever increasing number of locations. Unfortunately, most of the information gathered is used for marketing and advertising to the end user, e.g., a smartphone user receives a coupon to a nearby coffee shop, etc., while the security of our community is left exposed and at a risk of terrorist attacks such as the Boston Marathon bombers.

SUMMARY

Accordingly, a need has arisen for a solution to allow monitoring and collection of data from a plurality of sensors and management of the plurality of sensors for improving the security of our communities, e.g., by detecting radiation, etc. Further, there is a need to provide relevant information based on the sensors in an efficient manner to increase security.

In addition, a need has arisen for graphical user interface (GUI) tools that allow a user to specify a start time and/or an end time associated with a sensor, create events associated with sensors, modify events (e.g., add sensors to existing events, remove sensors from existing events, etc.), etc. Such a GUI tool may provide a tool for displaying sensor readings of a sensor in a timeline fashion.

In some embodiments, a system includes a sensor management module and a visualization module. The sensor management module may be configured to manage a plurality of sensors. The plurality of sensors may be configured to measure values associated with inputs therein. The visualization module may be configured to provide a graphical user interface (GUI) that includes a time chart tool for selecting a time period associated with a sensor of the plurality of sensors. The visualization module may be further configured to create an event with a start time based on the time period associated with the sensor.

In some embodiments, the time period is set based on a plurality of times. The created event may have an end time associated therewith. The end time may be based partly on the plurality of times. The time chart tool may be configured to render measured values of a sensor of the plurality of sensors on a display device. The time chart tool may be configured to update the rendition of measured values in real-time.

In some embodiments, the visualization module may be further configured to provide a selectable option that, when selected, presents a time selection tool in the GUI. The time selection tool may be configured to select the time period in response to a user manipulation. The time period associated with the sensor may be determined automatically and without user manipulation. It is appreciated that the measured values may be associated radiation.

In some embodiments, a method receives a user selection of a graphical user interface (GUI) element. The user selection may initiate a time selection tool. In response to the user selection of the GUI element, the method also automatically determines a time from a plurality of times associated with a sensor. The sensor may be configured to measure a value associated with an input therein at each time of the plurality of times. The method further creates an event. A time associated with the created event may be selected based on the position of the time selection tool.

In some embodiments, the GUI element is a first GUI element and the method may further receive through the GUI a user selection of a second GUI element for initiating a time chart tool that includes the time selection tool. The tool chart tool may be configured to display the measured values of the sensor in real-time. The method may also display the time selection tool in the GUI on a display device positioned at the determined time in response to receiving the selection of the GUI element. Creating the event may include generating a data structure that represents the event. Creating the event may further include setting a start time attribute of the data structure based on the determined time. The method may further receive an adjustment to the determined time through the time selection tool. It is appreciated that the measured values are associated with radiation.

In some embodiments, a system includes a sensor management module and a visualization module. The sensor management module may be configured to manage a plurality of sensors. The plurality of sensors may be configured to measure values associated with inputs therein. The visualization module may be configured to provide a graphical user interface (GUI) for modifying an already created event. The already created event may be associated with a first subset of the plurality of sensors. The already created event may have a start time and an end time. The modifying may be associated with changing the first subset and to form a second subset of the plurality of sensors. The start time and the end time may be modified in response to the modifying of the already created event.

In some embodiments, modifying the event may include adding a sensor to the first subset of the plurality of sensors to form the second subset of the plurality of sensors. The start time of the already created event may be modified to a start time associated with the added sensor when the start time associated with the added sensor is a time later than the start time of the already created event. The start time of the already created event may be modified to a start time associated with the added sensor when the start time associated with the added sensor is a time later than the start time of the already created event. 20. Modifying the event may include removing a sensor from the first subset of the plurality of sensors to form the second subset of the plurality of sensors.

These and various other features and advantages will be apparent from a reading of the following detailed description.

BRIEF DESCRIPTION OF DRAWINGS

The embodiments are illustrated by way of example, and not by way of limitation, in the figures of the accompanying drawings and in which like reference numerals refer to similar elements.

DETAILED DESCRIPTION

Figure 1:
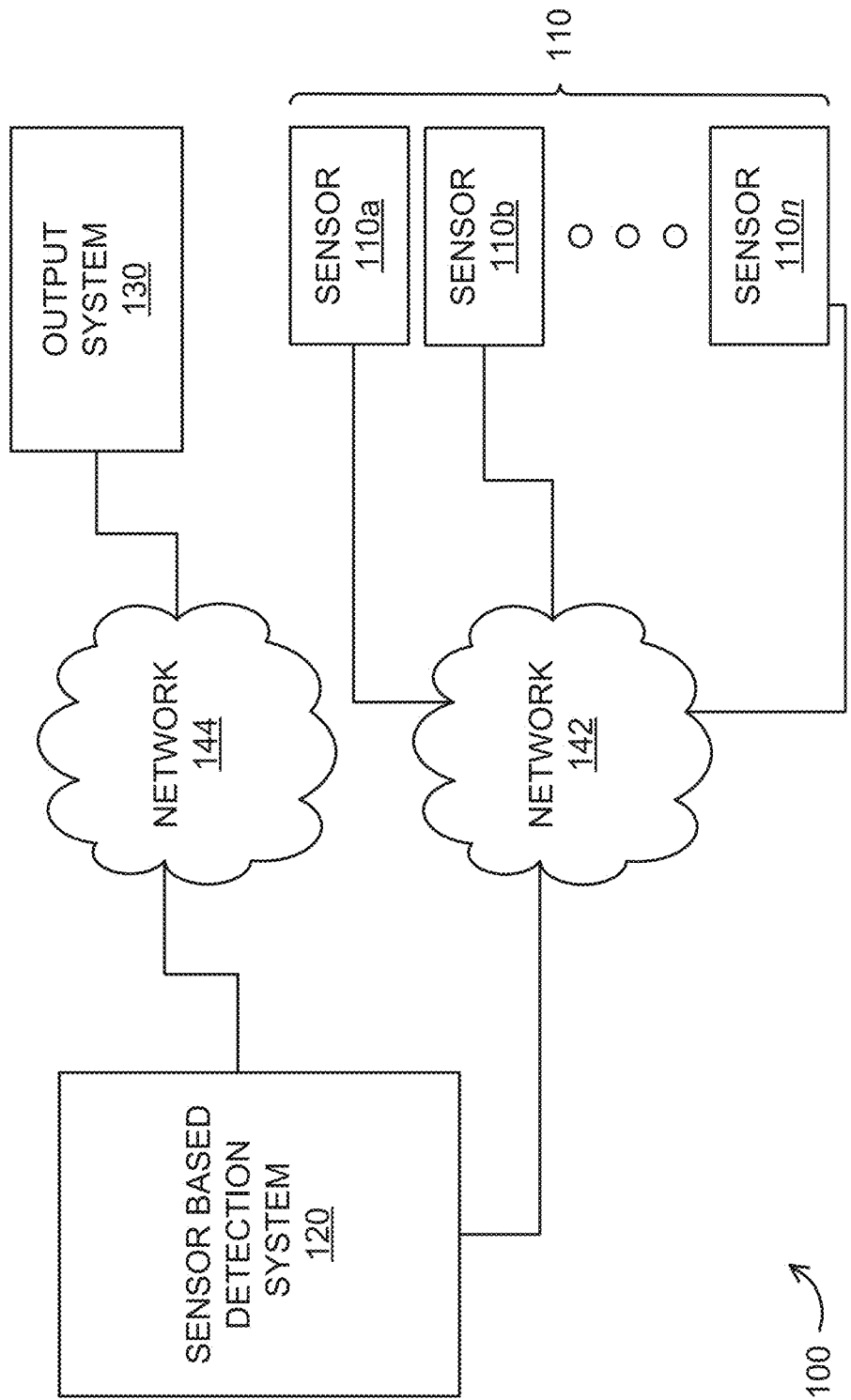
FIG. 1 shows an operating environment in accordance with some embodiments.

Reference will now be made in detail to various embodiments, examples of which are illustrated in the accompanying drawings. While various embodiments are described herein, it will be understood that these various embodiments are not intended to limit the scope of the embodiments. On the contrary, the embodiments are intended to cover alternatives, modifications, and equivalents, which may be included within the scope of the embodiments as construed according to the appended Claims. Furthermore, in the following detailed description of various embodiments, numerous specific details are set forth in order to provide a thorough understanding of the concept. However, it will be evident to one of ordinary skill in the art that the concept may be practiced without these specific details. In other instances, well known methods, procedures, components, and circuits have not been described in detail as not to unnecessarily obscure aspects of the concept and embodiments.

Some portions of the detailed descriptions that follow are presented in terms of procedures, logic blocks, processing, and other symbolic representations of operations on data bits within a computer memory. These descriptions and representations are the means used by those skilled in the data processing arts and data communication arts to most effectively convey the substance of their work to others skilled in the art. In the present application, a procedure, logic block, process, or the like, is conceived to be a self-consistent sequence of operations or steps or instructions leading to a desired result. The operations or steps are those utilizing physical manipulations of physical quantities. Usually, although not necessarily, these quantities take the form of electrical or magnetic signals capable of being stored, transferred, combined, compared, and otherwise manipulated in an electronic device, a computer system or computing device. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "identifying," "creating," "generating," "storing," "retrieving," "determining," "sending," "receiving," "transmitting," "communicating," "providing," "accessing," "associating," "disabling," "enabling," "configuring," "initiating," "starting," "terminating," "ending," "configuring," "forming," "grouping," "detecting," "selecting," "updating," "presenting," "displaying," "updating," "setting," "adjusting," "managing" or the like, refer to actions and processes of a computer system or similar electronic computing device or processor. The computer system or similar electronic computing device manipulates and transforms data represented as physical (electronic) quantities within the computer system memories, registers or other such information storage, transmission or display devices.

It is appreciated that present systems and methods can be implemented in a variety of architectures and configurations. For example, present systems and methods can be implemented as part of a distributed computing environment, a cloud computing environment, a client server environment, etc. Embodiments described herein may be discussed in the general context of machine-executable instructions residing on some form of machine-readable storage medium, such as program modules, executed by one or more computers, computing devices, or other devices. By way of example, and not limitation, machine-readable storage media may comprise computer storage media and communication media. Generally, program modules include routines, programs, objects, components, data structures, etc., that perform particular tasks or implement particular abstract data types. The functionality of the program modules may be combined or distributed as desired in various embodiments.

Computer storage media can include volatile and non-volatile, removable and non-removable media implemented in any method or technology for storage of information such as machine-readable instructions, data structures, program modules, or other data. Computer storage media can include, but is not limited to, random access memory (RAM), read only memory (ROM), electrically erasable programmable ROM (EEPROM), flash memory, or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can be accessed to retrieve that information.

Communication media can embody computer-executable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared and other wireless media. Combinations of any of the above can also be included within the scope of machine-readable storage media.

Accordingly, a need has arisen for a solution to allow monitoring and collection of data from a plurality of sensors and management of the plurality of sensors for improving the security of our communities, e.g., by detecting radiation, etc. Further, there is a need to provide relevant information based on the sensors in an efficient manner to increase security.

In addition, a need has arisen for GUI tools that allow a user to specify a start time and/or an end time associated with a sensor, create events associated with sensors, modify events (e.g., add sensors to existing events, remove sensors from existing events, etc.), etc. Such a GUI tool may provide a tool for displaying sensor readings of a sensor in a timeline fashion.

Embodiments described herein are directed to sensor-based detection systems that provide GUI tools for creating events based on satisfying certain conditions of sensors and modifying events by adding sensors to existing events (e.g., previously created events). In some embodiments, the GUI tools include a tool for displaying sensor readings of a sensor in a timeline manner. The GUI tools may include a tool for setting a start time and an end time associated with a sensor. The start time and end time associated with a sensor may be used to set a start time and end time associated with an event when the event is created. When an existing event is modified by adding a sensor to the existing event, the start time and end time associated with the existing event may be adjusted.

FIG. 1 shows a system in accordance with some embodiments. The system 100 includes a sensor-based detection system 120, a first network 142, a second network 144, an output system 130, and sensors 110, including sensors 110a, 110b, ..., 110n, wherein n is the $n^{th}$ sensor of any of a number of sensors. The sensor-based detection system 120 and the output system 130 are coupled to the second network 144. The sensor-based detection system 120 and output system 130 are communicatively coupled via the second network 144. The sensor-based detection system 120 and sensors 110 are coupled to the first network 142. The sensor-based detection system 120 and sensors 110 are communicatively coupled via the first network 142. Networks 142 and 144 may include more than one network (e.g., intranets, the Internet, local area networks (LAN)s, wide area networks (WAN)s, etc.), and networks 142 and 144 may be a combination of one or more networks including the Internet. In some embodiments, first network 142 and second network 144 may be a single network.

A sensor of the sensors 110 may generate a reading associated therewith (e.g., gamma radiation, vibration, etc.) associated with a certain condition (e.g., presence of a hazardous condition above a given threshold or within a certain range). and a sensor of the sensors 110 may transmit that information to the sensor-based detection system 120 for analysis. The sensor-based detection system 120 may use the received information to determine whether a reading from a sensor is a calibration reading; a normal or hazard-free reading from a sensor with respect to one or more hazards; an elevated reading from a sensor with respect to the one or more hazards; a potential warning reading from a sensor with respect to the one or more hazards; and a warning from a sensor with respect to the one or more hazards. The sensor-based detection system 120 may compare the received information to one or more threshold values (e.g., historical values, user-selected values, etc.) in order to determine the foregoing. In response to the determination, the sensor-based detection system 120 may transmit that information to the output system 130 for further analysis (e.g., user-based analysis) and/or action (e.g., e-mailing the appropriate personnel; sounding an alarm; tweeting a notification via Twitter™; notifying the police department; notifying the Department of Homeland Security; etc.).

The sensors 110 may be any of a variety of sensors including thermal sensors (e.g., temperature, heat, etc.), electromagnetic sensors (e.g., metal detectors, light sensors, particle sensors, Geiger counter, charge-coupled device (CCD), etc.), mechanical sensors (e.g., tachometer, odometer, etc.), complementary metal-oxide-semiconductor (CMOS), biological/chemical (e.g., toxins, nutrients, etc.), etc. The sensors 110 may further be any of a variety of sensors or a combination thereof including, but not limited to, acoustic, sound, vibration, automotive/transportation, chemical, electrical, magnetic, radio, environmental, weather, moisture, humidity, flow, fluid velocity, ionizing, atomic, subatomic, navigational, position, angle, displacement, distance, speed, acceleration, optical, light imaging, photon, pressure, force, density, level, thermal, heat, temperature, proximity, presence, radiation, Geiger counter, crystal-based portal sensors, biochemical, pressure, air quality, water quality, fire, flood, intrusion detection, motion detection, particle count, water level, surveillance cameras, etc. The sensors 110 may include video cameras (e.g., internet protocol (IP) video cameras) or purpose-built sensors.

The sensors 110 may be fixed in location (e.g., on a building or some other infrastructure, in a room, etc.), semi-fixed in location (e.g., on a cell tower on wheels, affixed to another semi-portable object, etc.), or mobile (e.g., part of a mobile device, smartphone, etc.). The sensors 110 may provide data to the sensor-based detection system 120 according to the type of the sensors 110. For example, sensors 110 may be CMOS sensors configured for gamma radiation detection. Gamma radiation may thus illuminate a pixel, which is converted into an electrical signal and sent to the sensor-based detection system 120.

The sensor-based detection system 120 may be configured to receive data and manage sensors 110. The sensor-based detection system 120 may be configured to assist users in monitoring and tracking sensor readings or levels at one or more locations. The sensor-based detection system 120 may have various components that allow for easy deployment of new sensors within a location (e.g., by an administrator) and allow for monitoring of the sensors to detect events based on user preferences, heuristics, etc. The events may be further analyzed on the output system 130 or used by the output system 130 to generate sensor-based notifications (e.g., based on sensor readings above a threshold for one sensor, based on the sensor readings of two sensors within a certain proximity being above a threshold, etc.) in order for the appropriate personnel to take action. The sensor-based detection system 120 may receive data and manage any number of sensors, which may be located at geographically disparate locations. In some embodiments, the sensors 110 and components of a sensor-based detection system 120 may be distributed over multiple systems (e.g., and virtualized) and a large geographical area.

The sensor-based detection system 120 may track and store location information (e.g., board room B, floor 2, terminal A, etc.) and global positioning system (GPS) coordinates (e.g., latitude, longitude, etc.) for a sensor or group of sensors. The sensor-based detection system 120 may be configured to monitor sensors and track sensor values to determine whether a defined event has occurred (e.g., whether a detected radiation level satisfies a certain condition such as exceeding a certain radiation threshold or range, etc.). As described further herein, if a defined event has occurred, then the sensor-based detection system 120 may determine a route or path a hazardous condition (e.g., dangerous or contraband material) has taken around or within range of the sensors. For example, the path of travel of radioactive material relative to fixed sensors may be determined and displayed via a GUI. It is appreciated that the path of travel of radioactive material relative to mobile sensors (e.g., smartphones, etc.) or relative to a mixture of fixed and mobile sensors may similarly be determined and displayed via a GUI. It is appreciated that the analysis and/or the sensed values may be displayed in real-time or stored for later retrieval.

The sensor-based detection system 120 may include a directly connected output system (e.g., a directly connected display), or the sensor-based detection system 120 may utilize the output system 130 (e.g., a networked display), any of which may be operable for a GUI for monitoring and managing sensors 110. As described further herein, the GUI may be configured for indicating sensor readings, sensor status, sensor locations on a map, etc. The sensor-based detection system 120 may allow review of past sensor readings and movement of sensor detected material or conditions based on stop, play, pause, fast forward, and rewind functionality of stored sensor values. The sensor-based detection system 120 may also allow viewing of an image or video footage (e.g., still images or motion) corresponding to sensors that had sensor readings above a threshold (e.g., based on a predetermined value or based on ambient sensor readings). For example, a sensor may be selected in a GUI and video footage associated with an area within a sensor's range of detection may be displayed, thereby enabling a user to see an individual or person transporting hazardous material. According to some embodiments the footage may be displayed in response to a user selection or it may be displayed automatically in response to a certain event (e.g., sensor reading associated with a particular sensor or group of sensors satisfying a certain condition such as hazardous conditions above a given threshold or within a certain range).

In some embodiments, sensor readings of one or more sensors may be displayed on a graph or chart for easy viewing. A visual map-based display depicting sensors (e.g., sensor representations) may be displayed with the sensors coded (e.g., by color, shape, icon, blinking or flashing rate, etc.) according to the sensors' readings bucketed according to pre-defined hazard levels. For example, gray may be associated with a calibration reading from a sensor; green may be associated with a normal or hazard-free reading from a sensor with respect to one or more hazards; yellow may be associated with an elevated reading from a sensor with respect to the one or more hazards; orange may be associated with a potential warning reading from a sensor with respect to the one or more hazards; and red may be associated with a warning from a sensor with respect to the one or more hazards.

The sensor-based detection system 120 may determine sensor readings above a specified threshold (e.g., predetermined, dynamic, or ambient based) or based on heuristics, and the sensor readings may be displayed in the GUI. The sensor-based detection system 120 may allow a user (e.g., operator) to group multiple sensors together to create an event associated with multiple sensor readings (e.g., warnings or other highly valued sensor readings) from multiple sensors. For example, a code red event may be created when three sensors or more within twenty feet of one another and within the same physical space (e.g., same floor) have a sensor reading that is at least 40% above the historical values. In some embodiments, the sensor-based detection system 120 may automatically group sensors together based on geographical proximity of the sensors (e.g., sensors at Gates 11, 12, and 13 within Terminal 1 at Los Angeles International Airport [LAX] may be grouped together due to their proximity to each other), whereas sensors in different terminals may not be grouped because of their disparate locations. However, in certain circumstances sensors within the same airport may be grouped together in order to monitor events at the airport and not at a more granular level of terminals, gates, etc.

The sensor-based detection system 120 may send information to an output system 130 at any time, including upon the determination of an event created from the information collected from the sensors 110. The output system 130 may include any one or more output devices for processing the information from the sensor-based detection system 120 into a human-comprehendible form (e.g., text, graphic, video, audio, a tactile form such as vibration, etc.). The one or more output devices may include, but are not limited to, output devices selected from printers, plotters, displays, monitors, projectors, televisions, speakers, headphones, and radios. The output system 130 may further include, but is not limited to, one or more messaging systems or platforms selected from a database (e.g., messaging, SQL, or other database); short message service (SMS); multimedia messaging service (MMS); instant messaging services; Twitter™ available from Twitter, Inc. of San Francisco, Calif.; Extensible Markup Language (XML) based messaging service (e.g., for communication with a Fusion center); and JavaScript™ Object Notation (JSON) messaging service. For example, national information exchange model (NIEM) compliant messaging may be used to report chemical, biological, radiological, and nuclear defense (CBRN) suspicious activity reports (SARs) to report to government entities (e.g., local, state, or federal government).

Figure 2:
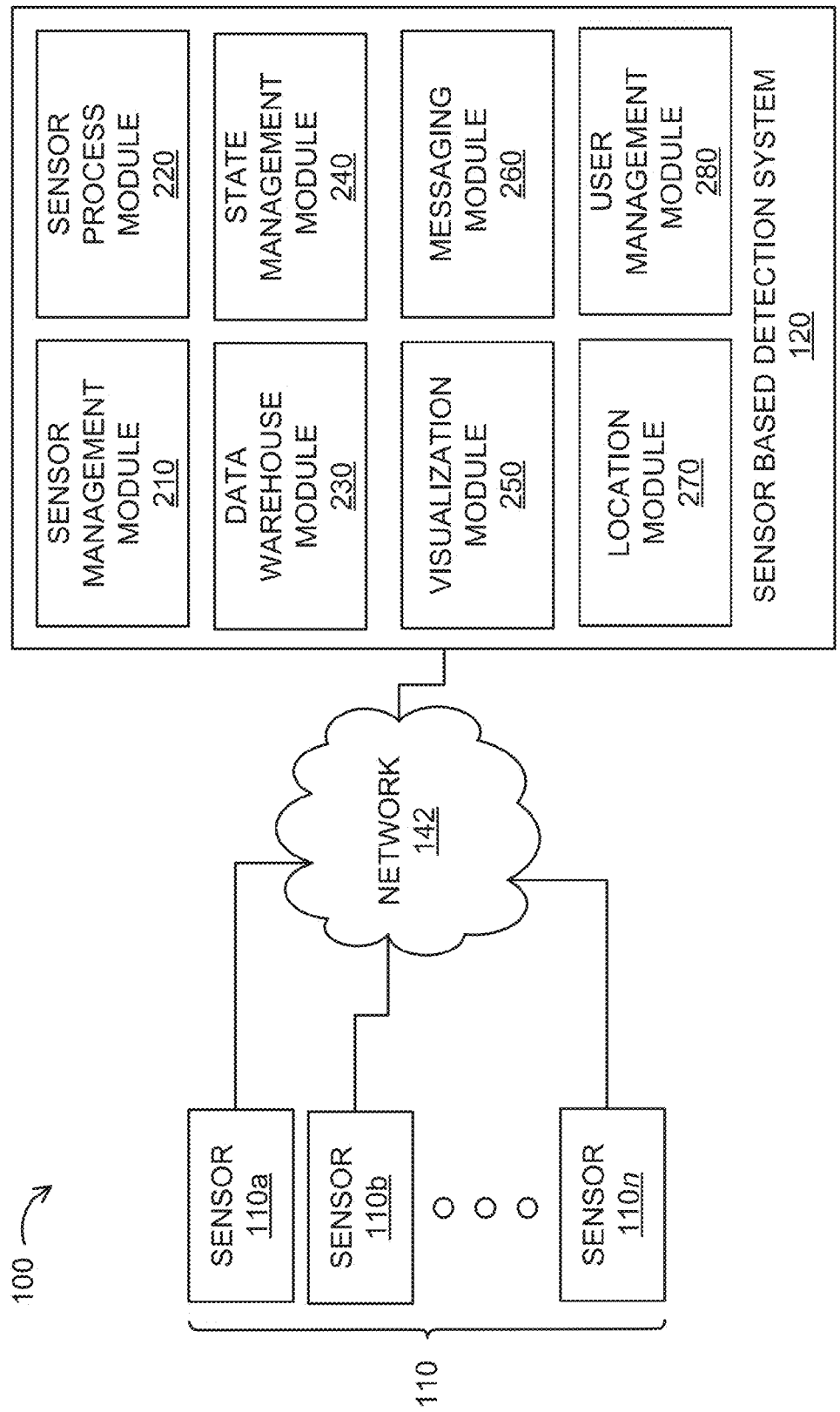
FIG. 2 shows components of a sensor-based detection system in accordance with some embodiments.

FIG. 2 shows some components of the sensor-based detection system in accordance with some embodiments. The portion of system 100 shown in FIG. 2 includes the sensors 110, the first network 142, and the sensor-based detection system 120. The sensor-based detection system 120 and the sensors 110 are communicatively coupled via the first network 142. The first network 142 may include more than one network (e.g., intranets, the Internet, LANs, WANs, etc.) and may be a combination of one or more networks (e.g., the second network 144) including the Internet. The sensors 110 may be any of a variety of sensors, as described herein.

The sensor-based detection system 120 may access or receive data from the sensors 110. The sensor-based detection system 120 may include a sensor management module 210, a sensor process module 220, a data warehouse module 230, a state management module 240, a visualization module 250, a messaging module 260, a location module 270, and a user management module 280.

In some embodiments, the sensor-based detection system 120 may be distributed over multiple servers (e.g., physical or virtual machines). For example, a domain server may execute the data warehouse module 230 and the visualization module 250, a location server may execute the sensor management module 210 and one or more instances of a sensor process module 220, and a messaging server may execute the messaging module 260. For example, multiple location servers may be located at respective sites having 110 sensors, and provide analytics to a single domain server, which provides a monitoring and management interface (e.g., GUI) and messaging services. The domain server may be centrally located while the location servers may be located proximate to the sensors for bandwidth purposes.

The sensor management module 210 may be configured to monitor and manage the sensors 110. The sensor management module 210 is configured to initiate one or more instances of sensor process module 220 for monitoring and managing the sensors 110. The sensor management module 210 is operable to configure a new sensor process (e.g., an instance of sensor process module 220) when a new sensor is installed. The sensor management module 210 may thus initiate execution of multiple instances of the sensor process module 220. In some embodiments, an instance of the sensor process module 220 is executed for one or more sensors. For example, if there are 50 sensors, 50 instances of sensor process module 220 are executed in order to configure the sensors. It is further appreciated that the sensor management module 210 may also be operable to configure an already existing sensor. For example, the sensor 110$a$ may have been configured previously; however, the sensor management module 210 may reconfigure the sensor 110$a$ based on the new configuration parameters. The sensor management module 210 may be configured as an aggregator and collector of data from the sensors 110 via sensor process module 220. Sensor management module 210 may be configured to send data received via instances of sensor process module 220 to a data warehouse module 230.

The sensor management module 210 further allows monitoring of one or more instances of the sensor process module 220 to determine whether an instance of the sensor process module 220 is running properly or not. In some embodiments, the sensor management module 210 is configured to determine the health of one or more of the sensors 110 including if a sensor has failed based on whether an anticipated or predicted value is received within a certain time period. The sensor management module 210 may further be configured to determine whether data is arriving on time and whether the data indicates that the sensor is functioning properly (e.g., healthy) or not. For example, a radiation sensor may be expected to provide a certain microsievert ($\mu$Sv) value within a given time period. In some embodiments, the anticipated value may be received from an analytics engine that analyzes the sensor data. In some embodiments, the sensor management module 210 may be configured to receive an indicator of status from a sensor (e.g., an alive signal, an error signal, or an on/off signal). The health information may be used for management of the sensors 110 and the health information associated with the sensors may be stored in the data warehouse 230.

The sensor management module 210 may further access and examine the outputs from the sensors 110 based on a predictable rate of output. For example, an analytics process (e.g., performed by the sensor process module 220) associated with a sensor may produce a record every ten seconds and if a record is not received (e.g., within multiple 10 second periods of time), the sensor management module 210 may stop and restart the analytics process. In some embodiments, the record may be a flat file.

The sensor process module 220 may be configured to receive data (e.g., bulk or raw data) from the sensors 110. In some embodiments, the sensor process module 220 may form a record (e.g., a flat file) based on the data received from the sensors 110. The sensor process module 220 may perform analysis of the raw data (e.g., analyze frames of video to determine sensor readings). In some embodiments, the sensor process module 220 may then pass the records to the sensor management module 210.

The data warehouse module 230 is configured to receive data from sensor management module 210. The data warehouse module 230 may be configured for storing sensor readings and metadata associated with the sensors. Metadata for the sensors may include their respective geographical information (e.g., GPS coordinates, latitude, longitude, etc.), description of the sensor (e.g., Sensor 1 at Gate 1 of Terminal 1 at LAX, etc.). In some embodiments, the data warehouse module 230 may be configured to determine state changes based on monitoring (e.g., real time monitoring) of the state of a sensor and/or the state of the sensor over a time interval (e.g., 30 seconds, 1 minute, 1 hour, etc.). In some embodiments, the data warehouse module 230 is configured to generate a notification (e.g., when a sensor state has changed and is above a threshold or within a certain range; when a sensor reading satisfies a certain condition such as being below a threshold or within a certain range; etc.). The generated notification may be sent to visualization module 250 for display (e.g., to a user) on a directly connected display or a networked display (via output system 130). Changes in sensor state may thus be brought to the attention of a user (e.g., operator). It is appreciated that the threshold values may be one or more historical values, safe readings, operator selected values, etc.

In some embodiments, the data warehouse module 230 may be implemented in a substantially similar manner as described in Philippines Patent Application No. 1-2013-000136 titled, "A Domain Agnostic Method and System for the Capture, Storage, and Analysis of Sensor Reading," by Ferdinand E. K. de Antoni, which is incorporated herein by reference in its entirety, and U.S. patent application Ser. No. 14/284,009, titled "User Query and Gauge-Reading Relationships," by Ferdinand E. K. de Antoni, which is incorporated herein by reference in its entirety.

The state management module 240 may read data from the data warehouse module 230 and/or from the sensor management module 210 (e.g., data that was written by sensor management module 210) and determine whether a state change has occurred. The state change may be determined based on a formula to determine whether there has been a change since a previous record in time for an associated sensor and may take into account ambient sensor readings. If there is a change in state, a notification may be triggered. It is appreciated that state may also be a range of values. One or more notifications may be assembled into an event (e.g., a data structure comprising the one or more notifications). The event may then be accessed by or sent to a visualization module 250 for visualization of the event or the components thereof.

The visualization module 250 may be configured for use in monitoring sensors in a location. The visualization module 250 may provide the GUI or the information therefor for monitoring and managing one or more of the deployed sensors. In some embodiments, the visualization module 250 is configured to provide a tree filter to view the sensors in a hierarchical manner, as well as a map view, thereby allowing monitoring of one or more sensors in a geographical context. The visualization module 250 may further allow creation of an event case file to capture sensor notifications at any point in time and escalate the sensor notifications to appropriate authorities for further analysis (e.g., via a messaging system). The visualization module 250 may display a path of travel or route of hazardous materials or conditions based on sensor readings and the associated sensor locations. The visualization module 250 may further be used to zoom in and zoom out on a group of sensors (e.g., sensors within a terminal at an airport, etc.). As such, the information may be displayed as granular as desired by the operator. Visualization module 250 may also be used and render information in response to a user manipulation. For example, in response to a user selection of a sensor (e.g., sensor 110a) the sensor readings associated with the sensor may be displayed. In another example, a video feed associated with the sensor may also be displayed (e.g., simultaneously).

The messaging module 260 may be configured to send messages to other systems or messaging services including, but not limited to, a database (e.g., messaging, SQL, or other database); short message service (SMS); multimedia messaging service (MMS); instant messaging services; Twitter™ available from Twitter, Inc. of San Francisco, Calif.; Extensible Markup Language (XML) based messaging service (e.g., for communication with a Fusion center); JavaScript™ Object Notation (JSON) messaging service; etc. In one example, national information exchange model (NIEM) compliant messaging may be used to report chemical, biological, radiological, and nuclear defense (CBRN) suspicious activity reports (SARs) to report to government entities (e.g., local, state, or federal government). In some embodiments, the messaging module 260 may send messages based on data received from the sensor management module 210. It is appreciated that the messages may be formatted to comply with the requirements/standards of the messaging service used. For example, as described above a message may be formed into the NIEM format in order to repot a CBRN event.

The location module 270 may be configured for mapping and spatial analysis (e.g., triangulation) in order to represent (e.g., in a human-comprehendible form) one or more hazardous conditions among sensors in a location and/or one or more paths corresponding to the one or more hazardous conditions. For example, location module 270 may be configured to facilitate display of an icon for a hazardous condition among sensor representations (e.g., icons) for sensors at one or more gates of an airport terminal, as well as the path corresponding the hazardous condition. In some embodiments, the sensor management module 210 may be configured to store geographical data associated with a sensor in a data store (not shown) associated with location module 270. It is appreciated that the location module 270 may be used to provide mapping information associated with the sensor location such that the location of the sensor may overlay the map (e.g., location of the sensor may overlay the map of LAX, etc.). It is further appreciated that the location module 270 may be used to provide information associated with a hazardous condition (e.g., current location, path corresponding to the hazardous condition, etc.). The location module 270 may be configured to output information to the visualization module 250 where information related to the sensors and the hazardous condition may be rendered being rendered.

The user management module 280 may be configured for user management and storage of user identifiers of operators and administrators. The user management portion may be integrated with an existing user management systems (e.g., OpenLDAP or Active Director) thereby enabling use of existing user accounts to operate the sensor-based detection system 120.

Figure 3:
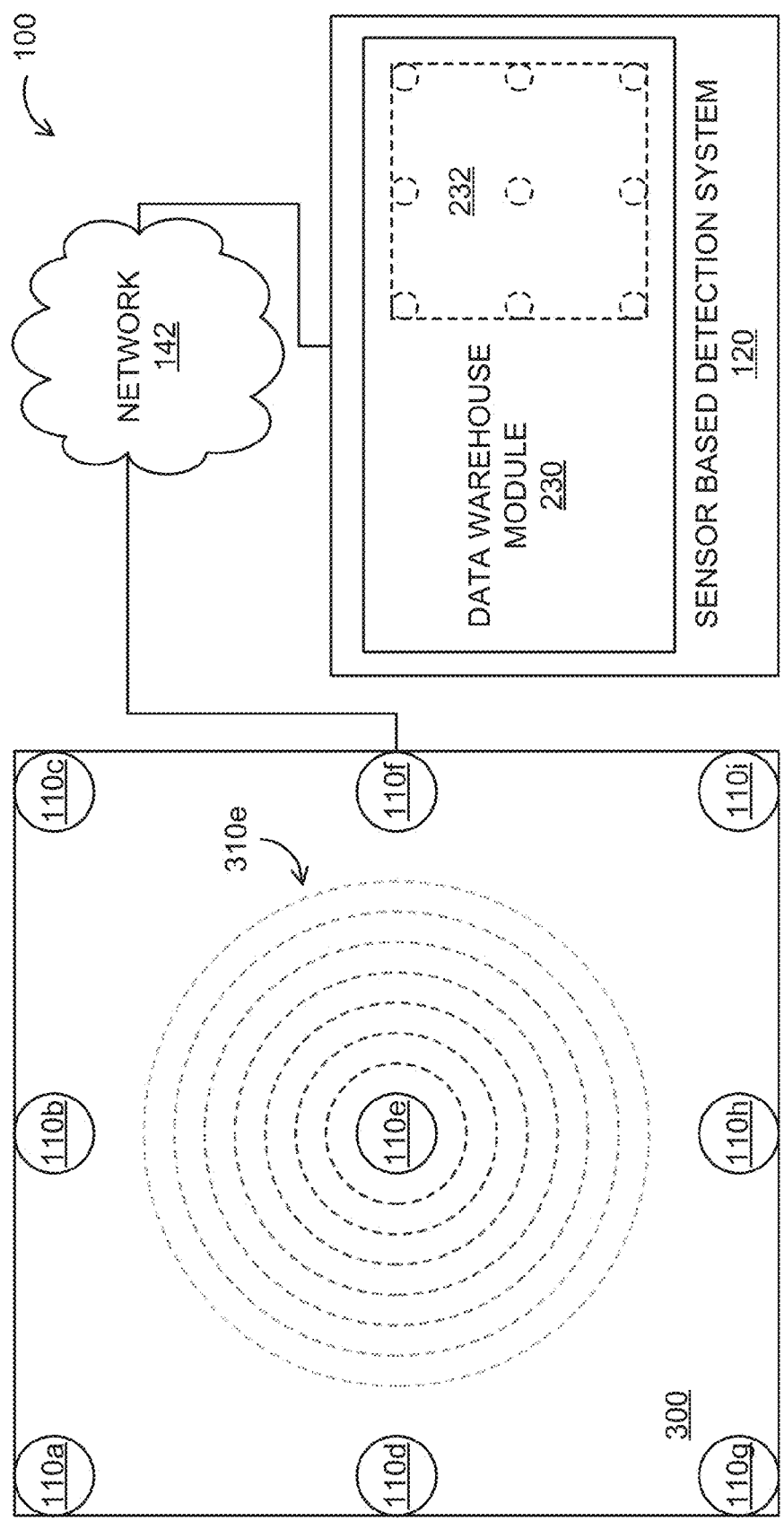
FIG. 3 shows a schematic of a sensor-based detection system and a sensor environment in accordance with some embodiments.

Referring now to FIG. 3, the sensors 110 (e.g., sensors 110a-110i) of the system 100 may be arranged in an environment 300 such as one of the environments described herein. While the sensors 110 of FIG. 3 are regularly arranged in the environment 300, it is appreciated the foregoing is for an expository purpose, and the sensors 110 need not be regularly arranged as shown. In other words, the sensors 110 may be positioned in any fashion, for example, equidistant from one another, non-equidistant from one another, or any combination thereof.

A sensor of the sensors 110 may have an associated detection range, one of which is graphically illustrated in FIG. 3 as a detection range 310e for a sensor 110e. As shown by the heavier concentric lines of the detection range 310e at radii nearer to the sensor 110e and the lighter concentric lines of the detection range 310e at radii farther from the sensor 110e, a hazardous condition (e.g., a hazardous material emitting ionizing radiation) may be more strongly and/or more quickly detected at radii nearer to the sensor 110e than at radii farther from the sensor 110e. Such a detection range may vary in accordance with sensor sensitivity for one or more hazardous conditions. Outside of such a detection range, a hazardous condition may not be detected at all. It is appreciated that sensors may detect radially about a point or axis, as shown, or in a directional fashion (e.g., unidirectional, bidirectional, etc.). Accordingly, illustration of the detection ranges for the sensors are exemplary and not intended to limit the scope of the embodiments.

The sensors 110 of environment 300 may be communicatively connected to the sensor-based detection system 120 through the first network 142 as shown in FIG. 3. As described herein, the data warehouse module 230 of the sensor-based detection system 120 may be configured for storing sensor readings and metadata (e.g., sensor description, geographical information, etc.) associated with the sensors 110. Such sensor readings and metadata for the sensors 110 may form a data structure associated with the data warehouse module 230, which is graphically depicted in FIG. 3 as data structure 232 in the data warehouse module 230.

Figure 4A:
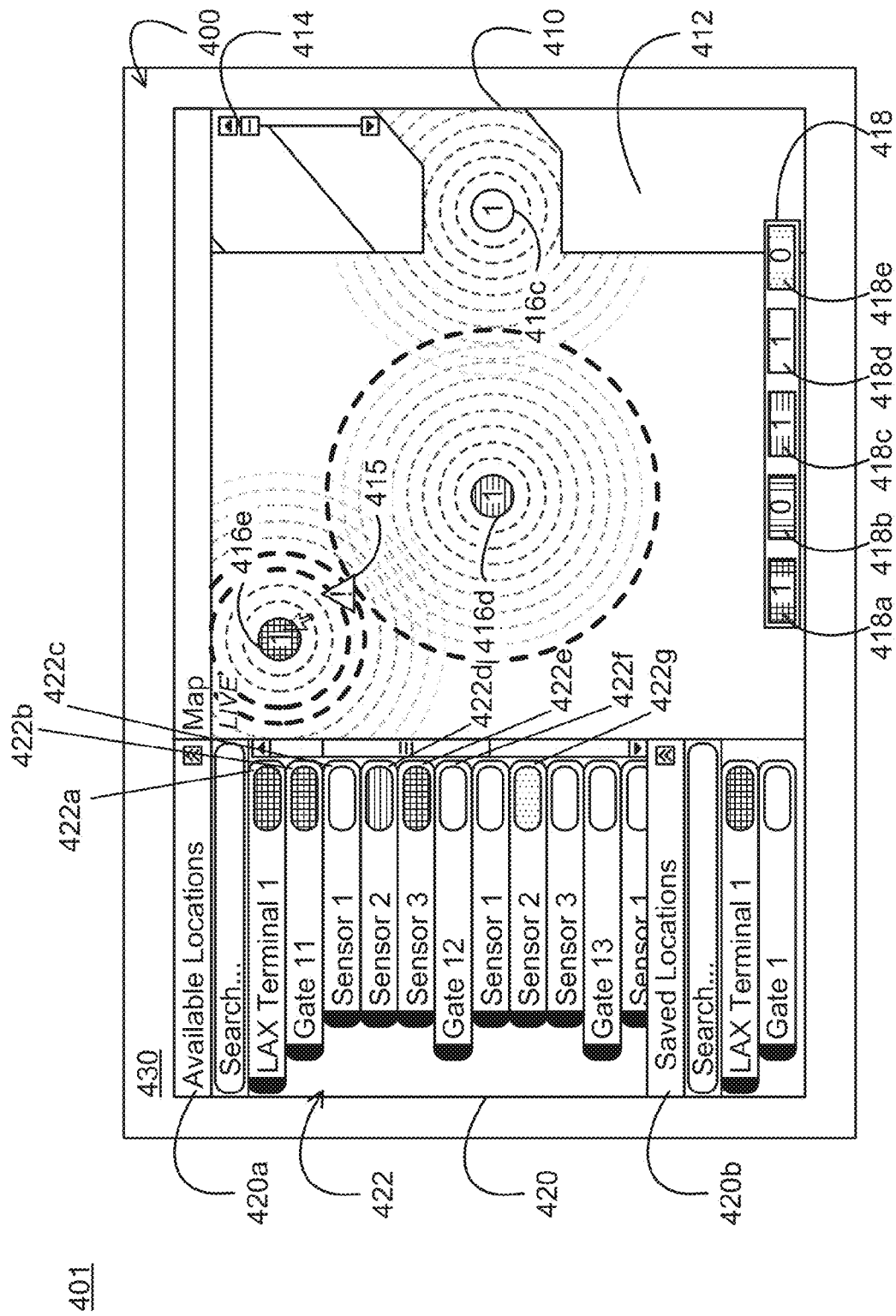
FIGS. 4A-4C show a GUI for initiating a time chart tool in accordance with some embodiments.
Figure 4B:
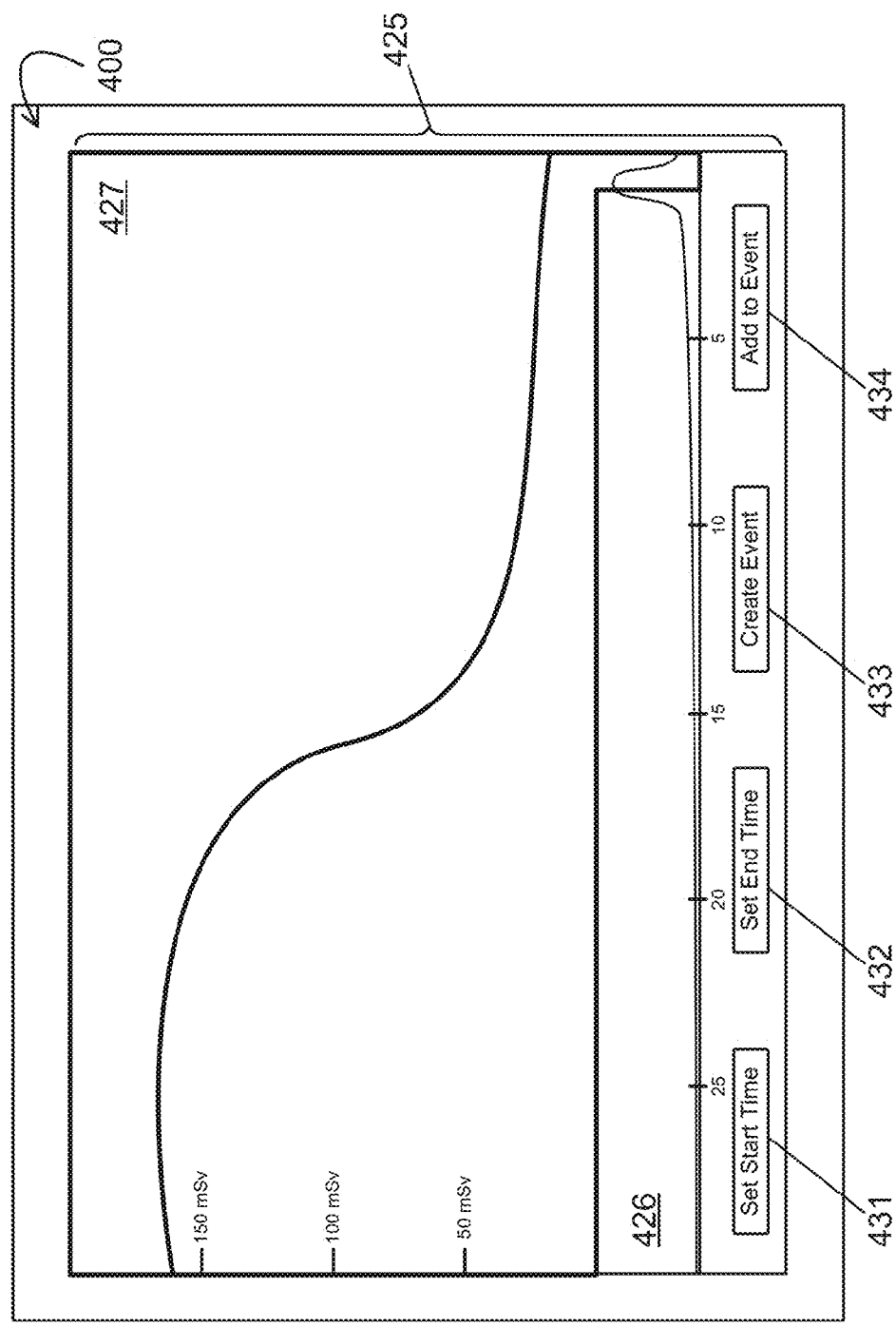
Figure 4C:
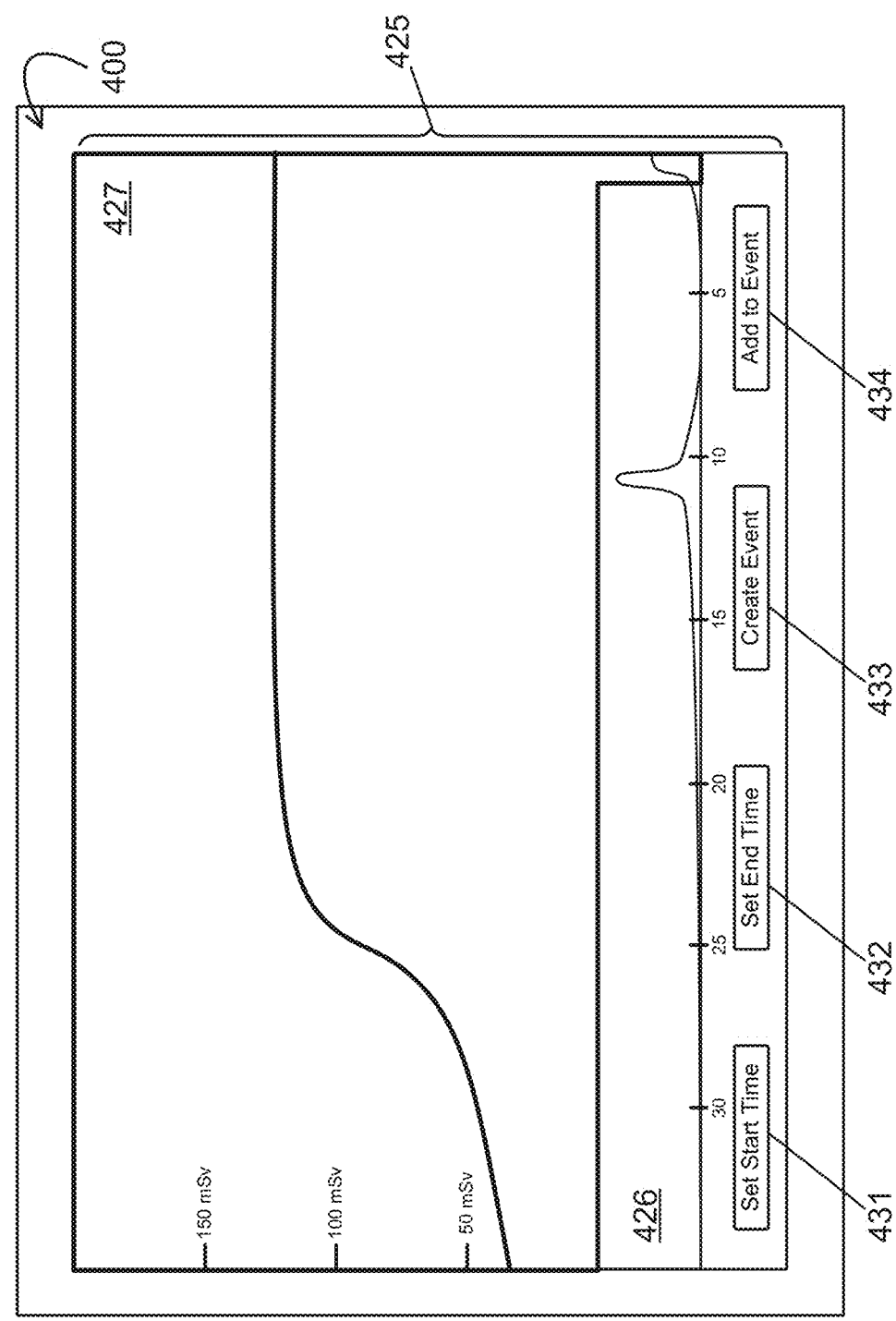

The sensor-based detection system 120 may include a directly connected output system (e.g., a directly connected display), or the sensor-based detection system 120 may utilize the output system 130 (e.g., a networked display), any of which may be operable to render a GUI for monitoring and/or managing the sensors 110. As described herein, a module (e.g., the visualization module 250) and/or an application may provide the GUI or the information therefor. FIGS. 4A-4C show such a GUI 400 on display 430 at three different instances 401, 402, and 403 of initiating a time chart tool in accordance with some embodiments. While the GUI 400 shown in FIGS. 4A-4C have a certain layout with certain elements, it is appreciated the foregoing is for an expository purpose, and the GUI 400 need not be as shown in FIGS. 4A-4C. Before describing the operation for initiating the time chart tool, the GUI 400 will first be described.

Referring now to FIG. 4A, the GUI 400 may include, but is not limited to, a map pane 410 and a location pane 420. The map pane 410 and the location pane 420 may be displayed individually or together as shown. In addition, any one of the map pane 410 or the location pane 420, or both, may be combined with other GUI structural elements as desired for monitoring and/or managing the sensors 110. Such other GUI structural elements include, but are not limited to, GUI structural elements selected from windows such as container windows, child windows, dialog boxes, property windows, message windows, confirmation windows, browser windows, text terminal windows, etc.; controls or widgets such as balloons, buttons (e.g., command buttons), links (e.g., hyperlinks), drop-down lists, combo boxes, group boxes, check boxes, list boxes, list views, notifications, progress bars, progressive disclosure controls, radio buttons, search boxes, sliders, spin controls, status bars, tabs, text boxes, tool tips, info tips, tree views, data grids, etc.; commands such as menus (e.g., menu bars, context menus, menu extras), toolbars, ribbons, etc.; and visuals such as icons, pointers, etc.

With respect to the map pane 410, the map pane 410 may include a map 412 generated by a geographical information system (GIS) on which a graphical representation of one or more of the sensors 110 may be present. The map 412 may be a real-time or live map, or the map 412 may be a historical map, of any combination thereof. A live map is shown in FIG. 4A as indicated by "LIVE" in the top, left-hand corner of the map 412. It is appreciated that "LIVE" is used for an expository purpose, and the live status of the map 412 need not be respectively indicated by "LIVE."

The map 412 may include different zoom levels including different levels of detail. The zoom level may be adjusted using a zoom level control. Such a zoom level control is shown as zoom level control 414 in FIG. 4A. The zoom level may range from a view from above the Earth to a view from inside a room of a building or a similar, human-sized scale, etc. The map 412 of FIG. 4A depicts a zoom level that shows a scale depicting Gate 11 of Terminal 1 of LAX.

A graphical representation of the one or more of the sensors 110 is shown in FIG. 4A as sensor representations 416c, 416d, and 416e. The sensor representations 416c, 416d, and 416e may indicate one sensor at a human-sized scale (e.g., a room of a building), or the sensor representations 416c, 416d, and 416e may indicate one sensor or a cluster of two or more sensors at a larger scale (e.g., a building). When the sensor representations 416c, 416d, and 416e represent one sensor, the sensor representations 416c, 416d, and 416e may indicate the sensor reading (e.g., normal, elevated, potential warning, warning readings with respect to one or more hazards, actual measurements from the sensors, etc.) for the respective one sensor. When the sensor representations 416c, 416d, and 416e represent a cluster of two or more sensors, the sensor representations 416c, 416d, and 416e may indicate the highest sensor reading for the cluster in some embodiments. The sensor representations 416c, 416d, and 416e depicted in FIG. 4A indicate a cluster of three sensors at Gate 11 of LAX.

The cluster of sensors depicted in FIG. 4A may represent a user selection for the cluster. Such a user selection may result from selecting (e.g., clicking) a sensor representation (not shown) for the cluster at an airport-sized (e.g., LAX-sized) scale, for example, on the basis of a warning reading with respect to one or more hazards. Such a user selection may alternatively result from choosing a saved location (e.g., Gate 11 at Terminal 11 of LAX) in the location pane 420 or searching (e.g., searching for Gate 11 of LAX) in the location pane 420.

The map 412 may include a sensor filter 418 providing a visual indicator useful for identifying sensor readings (e.g., normal, elevated, potential warning, and warning readings with respect to one or more hazards) for one or more sensors at a glance. The sensor filter 418 may also provide a means for selecting one or more sensors by like sensor readings (e.g., all sensors with warning readings with respect to one or more hazards may be selected). The sensor filter 418 may correspond to one or more sensor representations such as the sensor representations 416c, 416d, and 416e. As such, the sensor filter 418 may correspond to one sensor, or the sensor filter 418 may correspond to a cluster of two or more sensors at a larger scale (e.g., a building), which may be defined by zoom level manipulation, active user selection, or the like, as described herein. The sensor filter 418 may automatically adjust to match the zoom level of the map 412 and/or a user selection for the sensors in the map 412.

The filter sensor 418 of FIG. 4A may include a first filter sensor element 418a, a second filter sensor element 418b, a third filter sensor element 418c, a fourth filter sensor element 418d, and a fifth filter sensor element 418e, each of which may indicate a different sensor reading (e.g., calibrating or a normal, elevated, potential warning, or warning reading with respect to one or more hazards), and each of which may indicate the total number of sensors in a cluster of sensor having the different sensor reading. In this example, the sensor filter 418 of FIG. 4A indicates a cluster of three sensors at Gate 11 of Terminal 1 of LAX.

With respect to the cluster of three sensors, the first filter sensor element 418a of FIG. 4A indicates one sensor of the cluster has a warning reading (e.g., as represented by sensor representation 416e) with respect to one or more hazards including a hazardous condition 415, which hazardous condition may or may not be displayed in the GUI. The second filter sensor element 418b indicates no sensor of the cluster has an elevated reading with respect to one or more hazards. The third filter sensor element 418c indicates one sensor of the cluster has a potential warning reading (e.g., represented by sensor representation 416d) with respect to one or more hazards including the hazardous condition 415. The fourth filter sensor element 418d indicates one sensor of the cluster has a normal reading (e.g., represented by sensor representation 416c) with respect to one or more hazards. The fifth filter sensor element 418e indicates no sensor of the cluster is calibrating. It is appreciated that detection ranges may be graphically illustrated in FIG. 4A for the sensor representations 416c, 416d, and 416e. It is appreciated that the five filters and the five different states represented are for illustration purposes and not intended to limit the scope of the embodiments.

With respect to the location pane 420, the location pane 420 may include, but is not limited to, a first location sub-pane 420a and a second location sub-pane 420b, wherein the first location sub-pane 420a includes available locations for monitoring and/or managing sensors, and wherein the second location sub-pane 420b includes saved locations (e.g., favorite locations) for monitoring and/or managing sensors. Additional sub-panes may include additional groupings of locations. The first and second location sub-panes may include indicators 422 (e.g., 422a-422g). It is appreciated that the indicators 422 change in response to zoom level manipulation, active user selection, or the like, as described herein. As shown in FIG. 4A, the indicators 422c, 422d, and 422e correspond to the three sensors at Gate 11 of LAX depicted by the sensor representations 416b, 416c, and 416e. The first and second location sub-panes may further include search boxes for finding one or more indicators 422.

In some embodiments, the indicators 422 may be arranged in a hierarchical relationship in the location pane 420. As shown, indicator 422a, which is titled "LAX Terminal 1," is the indicator for Terminal 1 of LAX. Indicator 422b, which is titled "Gate 11," is the indicator for Gate 11 of Terminal 1 of LAX. Indicators 422c, 422d, and 422e, which are titled, "Sensor 1," "Sensor 2," and "Sensor 3," respectively, are the indicators for Sensors 1-3 of Gate 11 of Terminal 1 of LAX. As such, the indicator 422a ("LAX Terminal 1") is a parent indicator of the indicator 422b ("Gate 11"), and the indicator 422b is a parent indicator of the indicators 422c ("Sensor 1"), 422d ("Sensor 2"), and 422e ("Sensor 3"). The indicators 422c ("Sensor 1"), 422d ("Sensor 2"), and 422e ("Sensor 3") may also be described as children indicators of the indicator 422b ("Gate 11"), and the indicator 422b may be described as a child indicator of the indicator 422a ("LAX Terminal 1"). It is appreciated that an indicator for LAX (not shown as scrolled out of view) is a parent indicator of the indicator 422a ("LAX Terminal 1").

When an indicator represents one sensor, the indicator may indicate the sensor reading (e.g., normal, elevated, potential warning, and warning readings with respect to one or more hazards) for the one sensor. For example, indicator 422e ("Sensor 3") may indicate a warning from a sensor with respect to one or more hazards because indicator 422e indicates only one sensor, as further optionally indicated by filter sensor 418a. When an indicator represents a cluster of two or more sensors, the indicator may indicate the highest sensor reading for the cluster. Alternatively, when an indicator represents a cluster of two or more sensors, the indicator may indicate the average sensor reading for the cluster in some embodiments.

The indicators 422 may be associated with a different sensor reading (e.g., normal, elevated, potential warning, and warning readings with respect to one or more hazards) in accordance with the hierarchical relationship. For example, the indicator 422c indicates Sensor 1 of Gate 11 of Terminal 1 of LAX has a normal reading with respect to one or more hazards, as further optionally indicated by correspondence with filter element 418d. The indicator 422d indicates Sensor 2 of Gate 1 of Terminal 11 of LAX has a potential warning reading with respect to one or more hazards, as further optionally indicated by correspondence with filter element 418c. The indicator 422e indicates Sensor 3 of Gate 11 of Terminal 1 of LAX has a warning reading with respect to one or more hazards, as further optionally indicated by correspondence with filter element 418a. Indicator 422g indicates a calibrating sensor. Because a calibrating sensor is not a hazard-related sensor reading (e.g., normal, elevated, potential warning, and warning readings with respect to one or more hazards), a calibrating sensor is not indicated hierarchically above its respective indicator. However, the calibrating sensor may be indicated hierarchically above its respective indicator as desired.

As shown in FIG. 4A, the first instance 401 of the GUI 400 illustrates a user selecting a sensor representation displayed in map 412. In particular, the user at this instance is selecting (e.g., by clicking) the sensor representation 416d, which graphically represents a sensor in the sensors 110.

Referring now to FIG. 4B, the second instance 402 of the GUI 400 shows the GUI 400 after a user selects the sensor representation 416d. It is appreciated that the sensor selection may be through means other than graphical representations, e.g., by typing the geo-locational position of the sensors, by typing in the name of the sensors, etc. In this example, an application that provides the GUI 400 transitions from displaying the GUI 400 at the first instance 401 to displaying the GUI 400 at the second instance 402 in response to the selection of sensor representation 416d. As illustrated, the GUI 400 in the second instance 402 is displaying a time chart tool 425. It is appreciated that the GUI 400 may display the time chart tool 425 in a pop-up window that overlays some or all of the GUI 400 illustrated in the first instance 401. The time chart tool 425 includes a broad-range time chart area 426, a narrow-range time chart area 427, and user-selectable items 431, 432, 433, and 434. User-selectable item 431 (e.g., set start time button 431) is for setting a start time associated with a sensor, user-selectable item 432 (e.g., set end time button 432) is for setting an end time associated with a sensor, user-selectable item 433 (e.g., create event button 433) is for creating an event, and user-selectable item 434 (e.g., add to event button 434) is for adding a sensor to an existing event.

The broad-range time chart area 426 is for displaying sensor readings of a sensor over a time interval (e.g., a day, a week, 30 days, 6 months, a year, 5 years, etc.). In other words, the broad-range time chart area 426 displays a timeline of sensor readings of the sensor. For this example, the broad-range time chart displays sensor readings from the past 30 days (e.g., the most recent 30 days) of a sensor in the sensors 110 that corresponds to the sensor representation 416d selected in the first instance 401. In some embodiments, the time interval of the broad-range time chart area 426 is predetermined. For example, the time interval of the broad-range time chart area 426 may be predetermined to include the entire history of sensor readings of a sensor (including current real-time sensor readings). As another example, the time interval of the broad-range time chart area 426 may be predetermined to be a portion (e.g., an interval, a percentage, etc.) of the entire history of sensor readings that includes the beginning of the entire history, the end of the entire history (e.g., including current real-time sensor readings), or a middle portion of the entire history that does not include the beginning of the entire history nor the end of the entire history. In other embodiments, the time interval of the broad-range time chart area 426 is specified and/or adjusted by a user (e.g., through a settings option, a GUI control (e.g., a GUI slider control, textbox control, etc.), and/or any means provided by the GUI 400).

The narrow-range time chart area 427 is for displaying sensor readings of a sensor over a portion of the time interval (e.g., an amount of time, a percentage of the time interval) displayed in the broad-range time charge area 426. As shown in FIG. 4B, the narrow-range time chart area 427 displays sensor readings from the past 24 hours (e.g., the most recent 24 hours) of a sensor in the sensors 110 that corresponds to the sensor representation 416d selected in the first instance 401. In some embodiments, the time interval of the narrow-range time chart area 427 is predetermined. In other embodiments, the time interval of the narrow-range time chart area 427 is specified and/or adjusted by a user (e.g., through a settings option, a GUI control (e.g., a GUI slider control, textbox control, etc.), and/or any means provided by the GUI 400).

Referring now to FIG. 4C, the third instance 403 of the GUI 400 shows the time chart tool 425 in the second instance 402 after an interval of time has passed. In this example, the GUI 400 at the third instance 403 shows the time chart tool 425 after 5 days have elapsed since the time chart tool 425 shown in the second instance 402. As shown, the GUI 400 is displaying sensor readings of the sensor from the past 24 hours, after 5 days have elapsed, in the narrow-range time chart area 427 with the most recent sensor readings displayed on the right side of the narrow-range time chart area 427.

As mentioned above, the broad-range time chart area 426 is for displaying sensor readings of a sensor over a time interval. In some embodiments, when the GUI 400 updates (e.g., in real-time) the broad-range time chart area 426 to display new sensor readings, the GUI 400 increases the time interval by an amount of time elapsed since the previous update to the broad-range time chart area 426. The GUI 400 then displays the sensor readings of the sensor over the increased time interval. As shown in FIG. 4C, the GUI 400 maintains the width of the broad-range time chart area 426 when displaying the sensor readings of the sensor over the increased time interval of 35 days in the broad-range time chart area 426, thereby causing the previously displayed sensor readings in the broad-range time chart area 426 to appear to have compressed. In some embodiments, the GUI 400 extends the width (e.g., extending the left side, the right side, or both sides) of the broad-range time chart area 426 to accommodate new sensor readings.

In some embodiments, the GUI 400 updates the broad-range time chart area 426 and the narrow-range time chart area 427 with new sensor readings in real-time, at defined intervals (e.g., once every 5 seconds, once every 30 seconds, once a minute, etc.), in response to user input (e.g., a user provides a command to refresh the broad-range time chart area 426 and/or the narrow-range time chart area 427), in response to the sensor configuration via sensor process module 220 and sensor management module 210, etc. It is appreciated that the GUI 400 may update the narrow-range time chart area 427 in the same or similar manner as that described for the updating of the broad-range time chart area 426. It is also appreciated that the GUI 400 may update the broad-range time chart area 426 in the same or similar manner as that described for the.

FIGS. 5A-5H show the GUI 400 at eight different instances 501, 502, 503, 504, 505, 506, 507, and 508 of creating an event in accordance with some embodiments. In some embodiments, an event may occur when certain conditions are satisfied by one or more sensors. For example, an event may be a grouping of occurrences that may include a sensor reading (e.g., a value of data) from one or more related sensors passing a threshold value, sensor readings from one or more related sensors passing a predetermined threshold value for a predetermined period of time, a sensor reading from one or more related sensors falling within a certain range of values, etc. As another example, an event may be a grouping of occurrences that may include one or more sensors having a certain reading, one or more sensors having a certain reading in chronological time order, (e.g., sensor 1 has a certain reading and 5 seconds after sensor 2 has the same reading, etc.), sensors of different types (e.g., temperature, radiation, pressure, humidity, etc.) having a certain readings. In addition, an event may be a grouping of occurrences that may be based on sensor readings of sensors and/or other data (e.g., the type of sensor reading such as a calibration reading, a normal reading, an elevated reading, a potential warning reading, a warning reading, etc.). The grouping of sensors may be based on various conditions, e.g., proximity of sensors to one another, geo-location of the sensors and their particular location, type of sensor, range of sensor detection, physical proximity of sensors, floor plan of a structure where the sensor is positioned or is next to, etc.

In some embodiments, an event may be associated with a set of sensors and a set of attributes (e.g., data values). For example, an event may have a name attribute, start time attribute, and an end time attribute associated with the event. The name attribute may specify a name for the event, the start time attribute may specify a time for the beginning of the event, and the end time attribute may specify a time for the end of the event. It is appreciated that additional and/or different attributes (e.g., a sensor type attribute for each sensor, a geo-location attribute for each sensor, a range of sensor detection attribute, etc.) for defining and/or describing an event may be associated with the event.

Figure 5A:
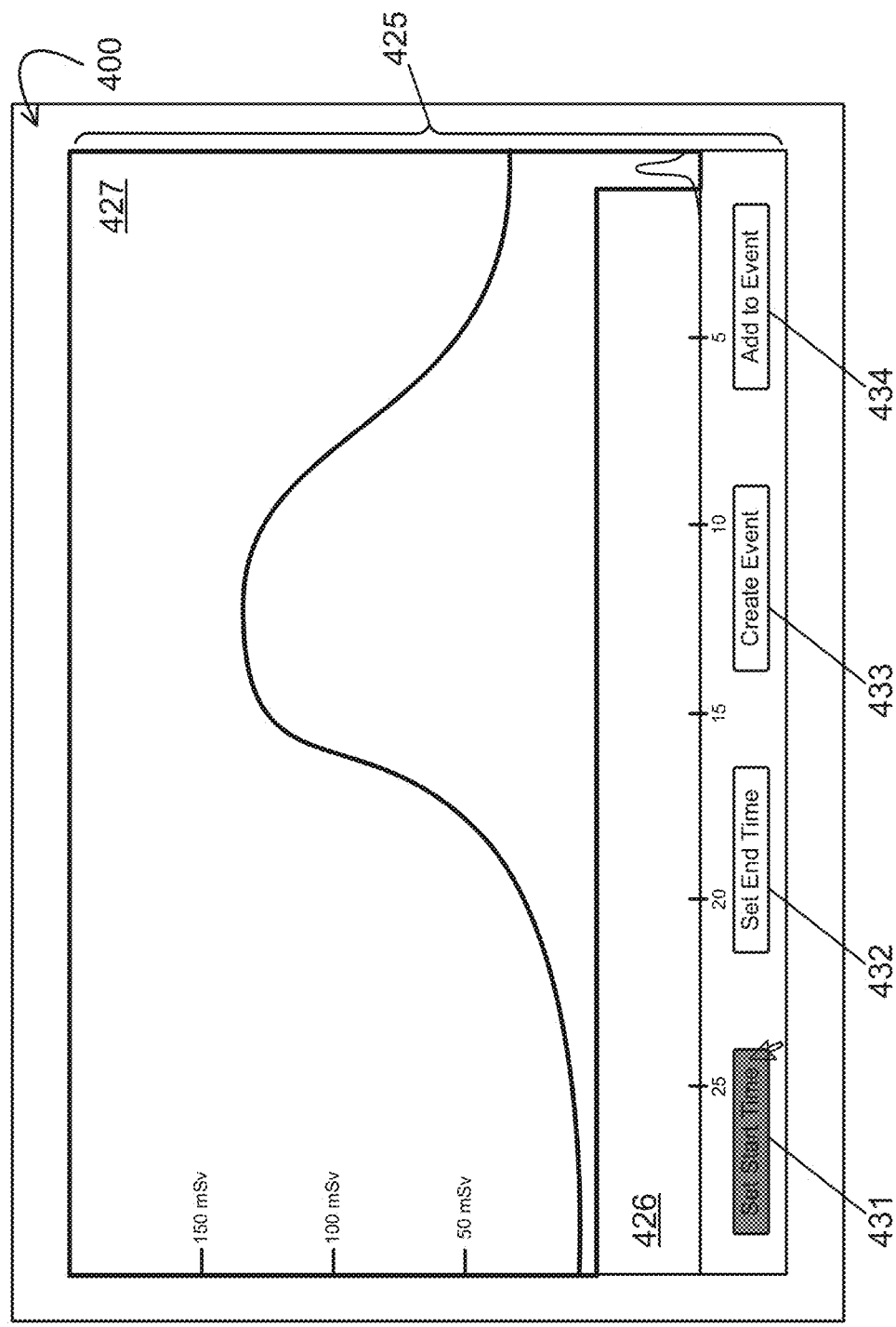
FIGS. 5A-5H show a GUI for creating an event in accordance with some embodiments.

Referring now to FIG. 5A, the first instance 501 of the GUI 400 is similar to the second instance 402 except that the first instance 501 shows the time chart tool 425 displaying different sensor readings (e.g., sensor readings of a later interval of time) as well as a user selecting an option for setting a start time for a sensor. In particular, the user at this instance is selecting (e.g., by clicking) the user-selectable item 431 to set a start time for a sensor.

Figure 5B:
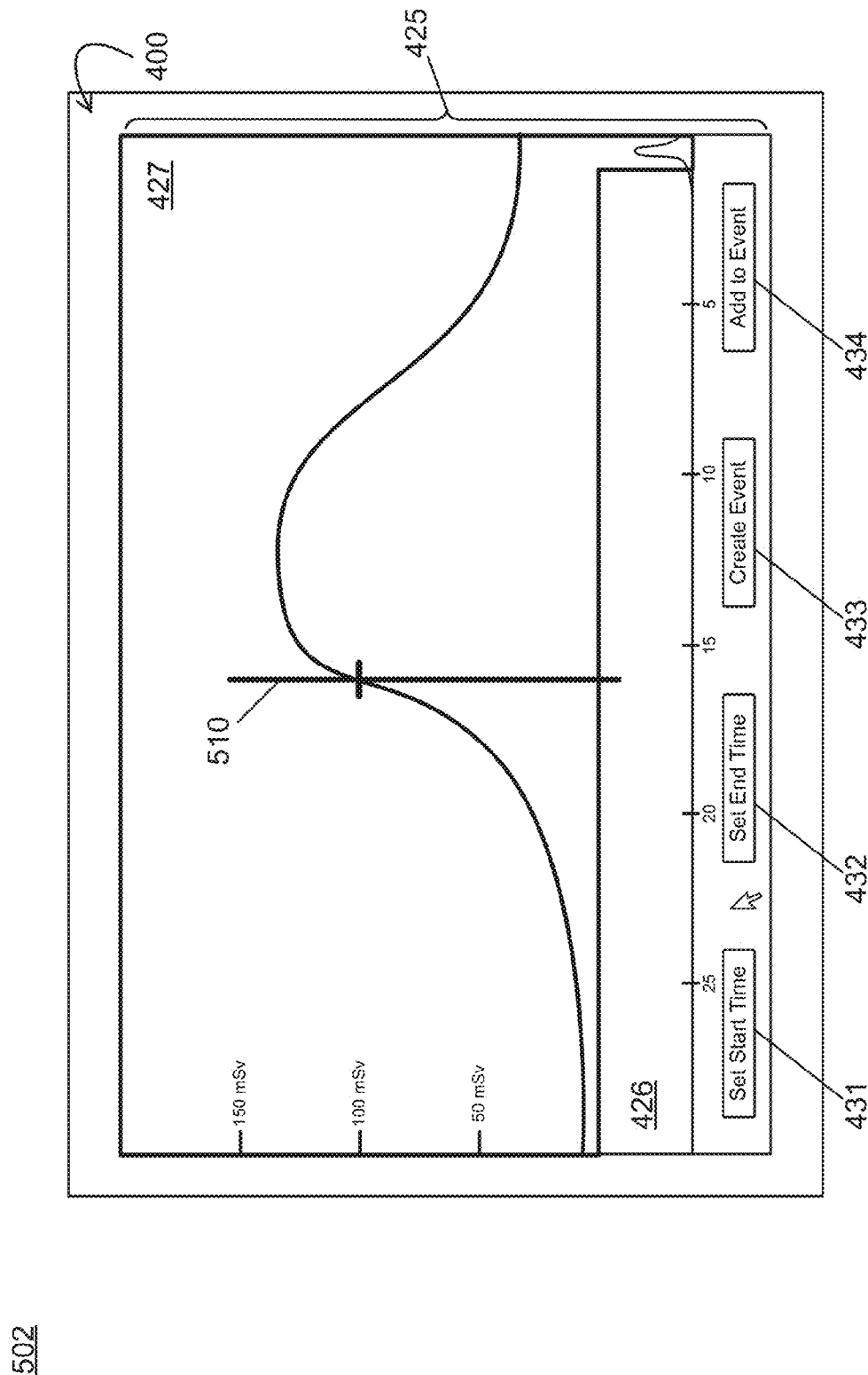

Referring now to FIG. 5B, the second instance 502 of the GUI 400 shows the GUI 400 after a user selects the user-selectable item 431. In this example, an application that provides the GUI 400 displays a start time selector 510 over the narrow-range time chart area 427 in response to the selection of the user-selectable item 431. The start time selector 510 is for specifying a start time associated with a sensor (e.g., a sensor in the sensors 110 that corresponds to the sensor representation 416d selected in the first instance 401). It is appreciated that the GUI 400, in some embodiments, may provide additional and/or different tools for a user to specify the start time associated with a sensor in response to the selection of user-selectable item 431. For example, the GUI 400 may provide a pop up window for specifying a start time through a calendar, a textbox for manually entering a start time, etc.

In some embodiments, the application that provides the GUI 400 automatically determines, without user manipulation, a start time associated with the sensor and displays the start time selector 510 at the determined start time. The application of some such embodiments automatically determines the start time as the time a sensor reading (e.g., a value of data) of the sensor passes a threshold value, the time sensor readings from the sensor passes a predetermined threshold value for a predetermined period of time, the time a sensor reading of the sensor falls within a certain range of values, etc. For this example, the application automatically determines the start time as the time a sensor reading of the sensor passes 100 millisievert (mSv) and displays the start time selector 510 at the determined start time, as illustrated in FIG. 5B.

Figure 5C:
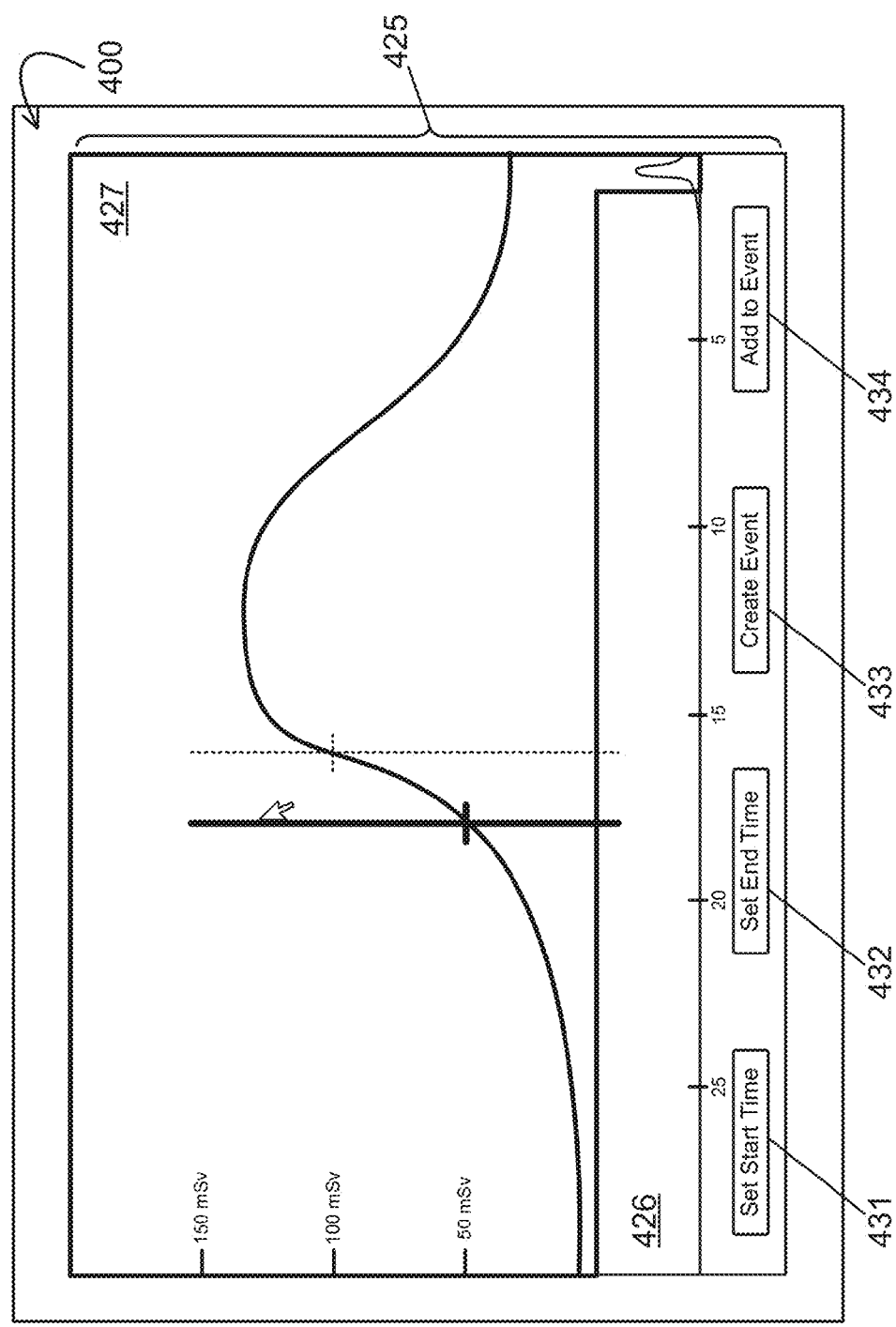

Referring now to FIG. 5C, the third instance 503 of the GUI 400 shows a user adjusting the start time for a sensor. As illustrated, the user at this instance is adjusting the start time for the sensor to an earlier point in time by moving (e.g., by click-and-dragging) the start time selector 510 in the narrow-range time chart area 427 towards the left.

Figure 5D:
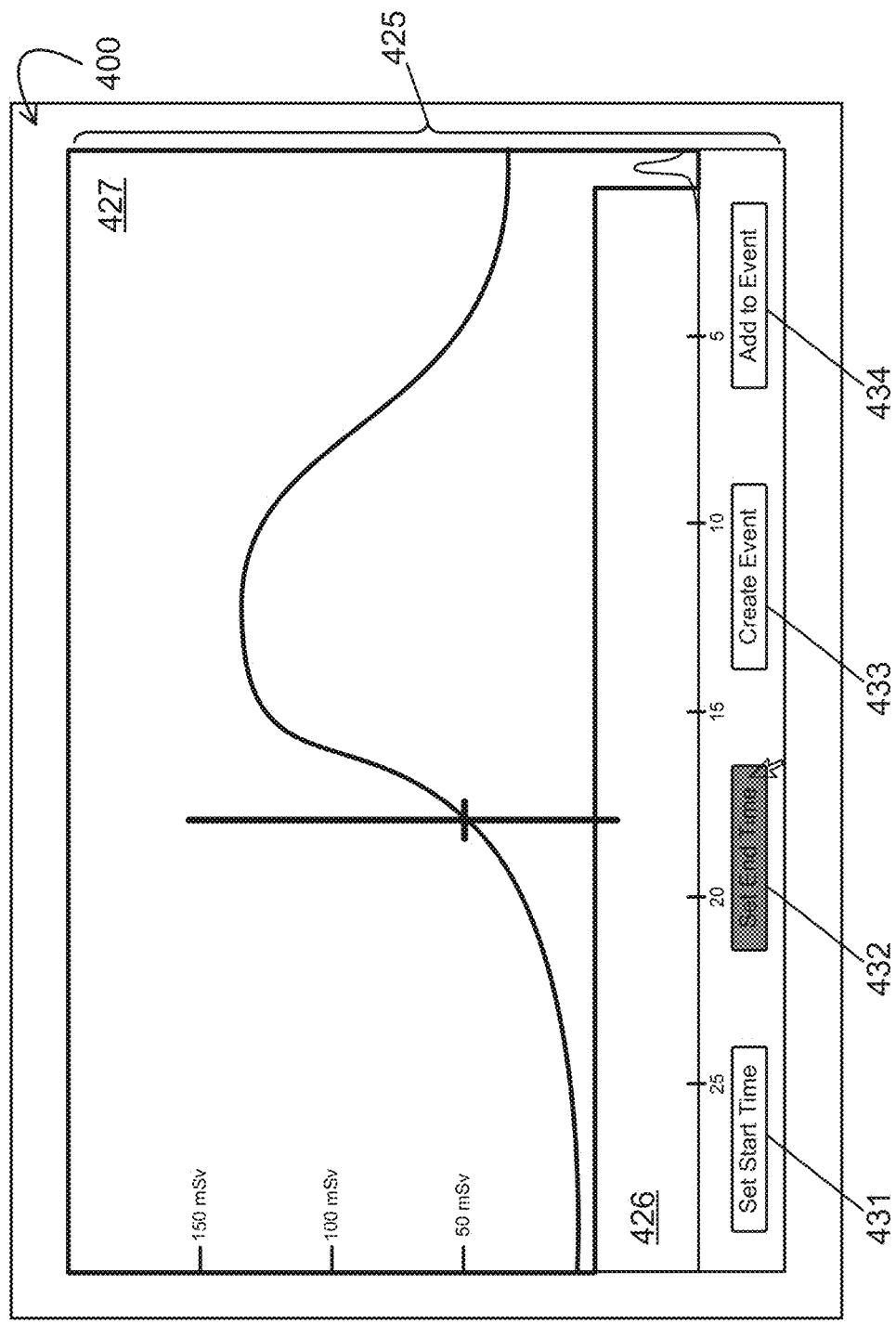

Referring now to FIG. 5D, the fourth instance 504 of the GUI 400 shows a user selecting an option for setting an end time for a sensor. Specifically, the user at this instance is selecting (e.g., by clicking) the user-selectable item 432 to set an end time for a sensor.

Figure 5E:
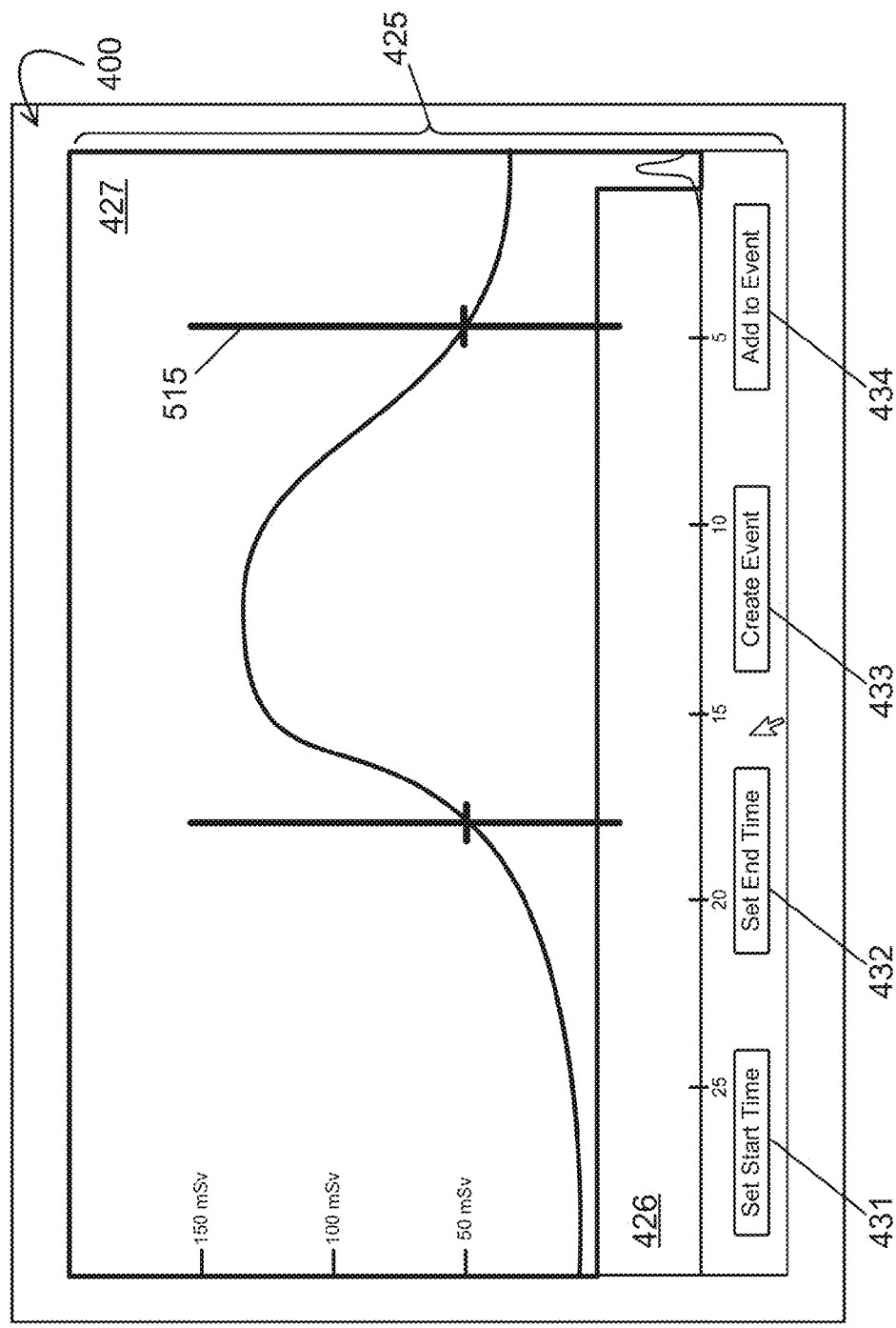

Referring now to FIG. 5E, the fifth instance 505 of the GUI 400 shows the GUI 400 after a user selects the user-selectable item 432. For this example, an application that provides the GUI 400 displays an end time selector 515 over the narrow-range time chart area 427 in response to the selection of the user-selectable item 432. The end time selector 515 is for specifying an end time associated with a sensor (e.g., a sensor in the sensors 110 that corresponds to the sensor representation 416d selected in the first instance 401). It is appreciated that the GUI 400, in some embodiments, may provide additional and/or different tools for a user to specify the end time associated with a sensor in response to the selection of user-selectable item 432. For example, the GUI 400 may provide a pop up window for specifying an end time through a calendar, a textbox for manually entering an end time, etc.

In some embodiments, the application that provides the GUI 400 automatically determines, without user manipulation, an end time associated with the sensor and displays the end time selector 515 at the determined end time. The application of some such embodiments automatically determines the end time as the time a sensor reading (e.g., a value of data) of the sensor passes a threshold value, the time sensor readings from the sensor passes a predetermined threshold value for a predetermined period of time, the time a sensor reading of the sensor falls within a certain range of values, etc. For this example, the application automatically determines the end time as the time a sensor reading of the sensor passes 50 mSv and displays the end time selector 515 at the determined end time, as illustrated in FIG. 5E.

Figure 5F:
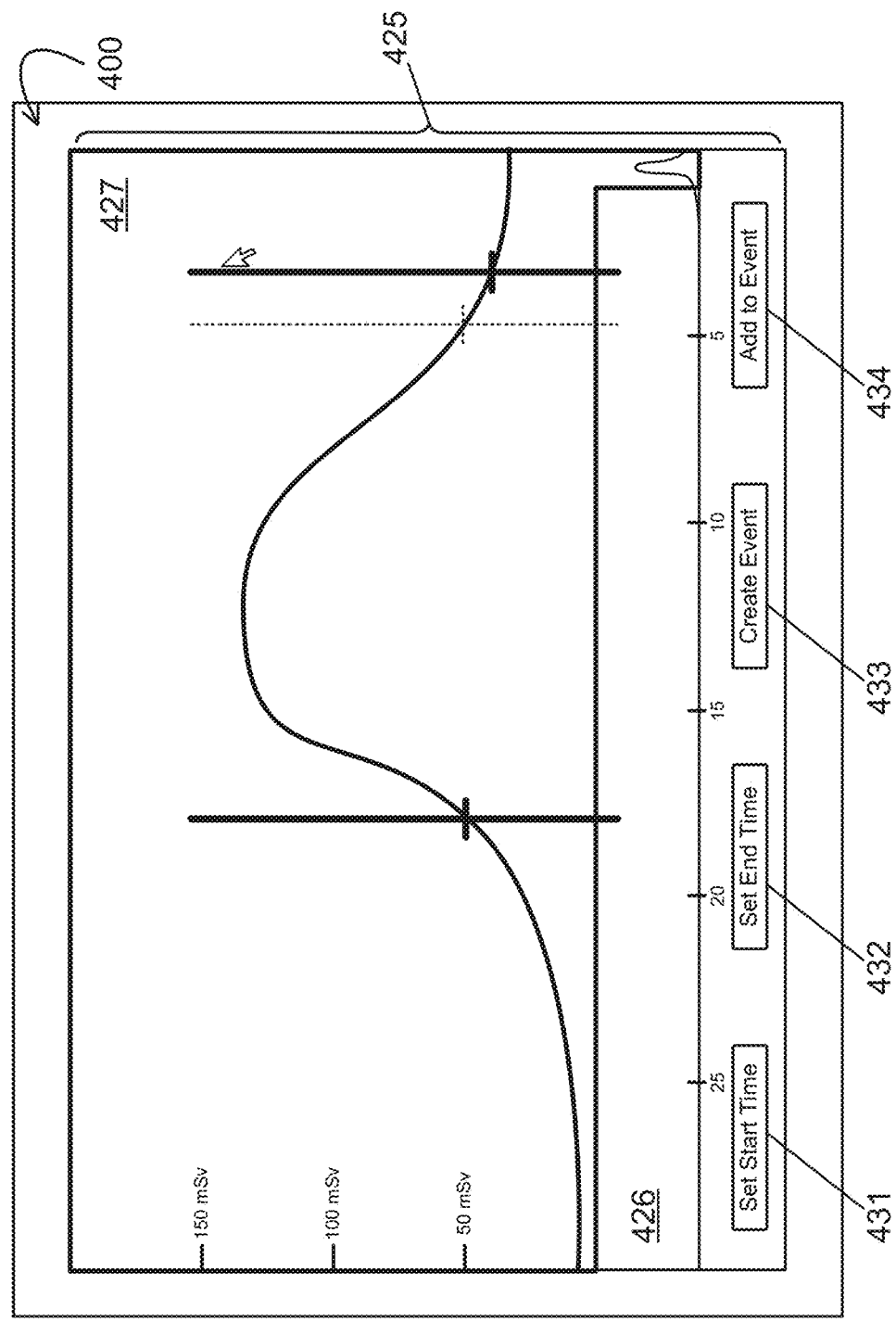

Referring now to FIG. 5F, the sixth instance 506 of the GUI 400 shows a user adjusting the end time for a sensor. As shown, the user at this instance is adjusting the end time for the sensor to a later point in time by moving (e.g., by click-and-dragging) the end time selector 515 in the narrow-range time chart area 427 towards the right.

Figure 5G:
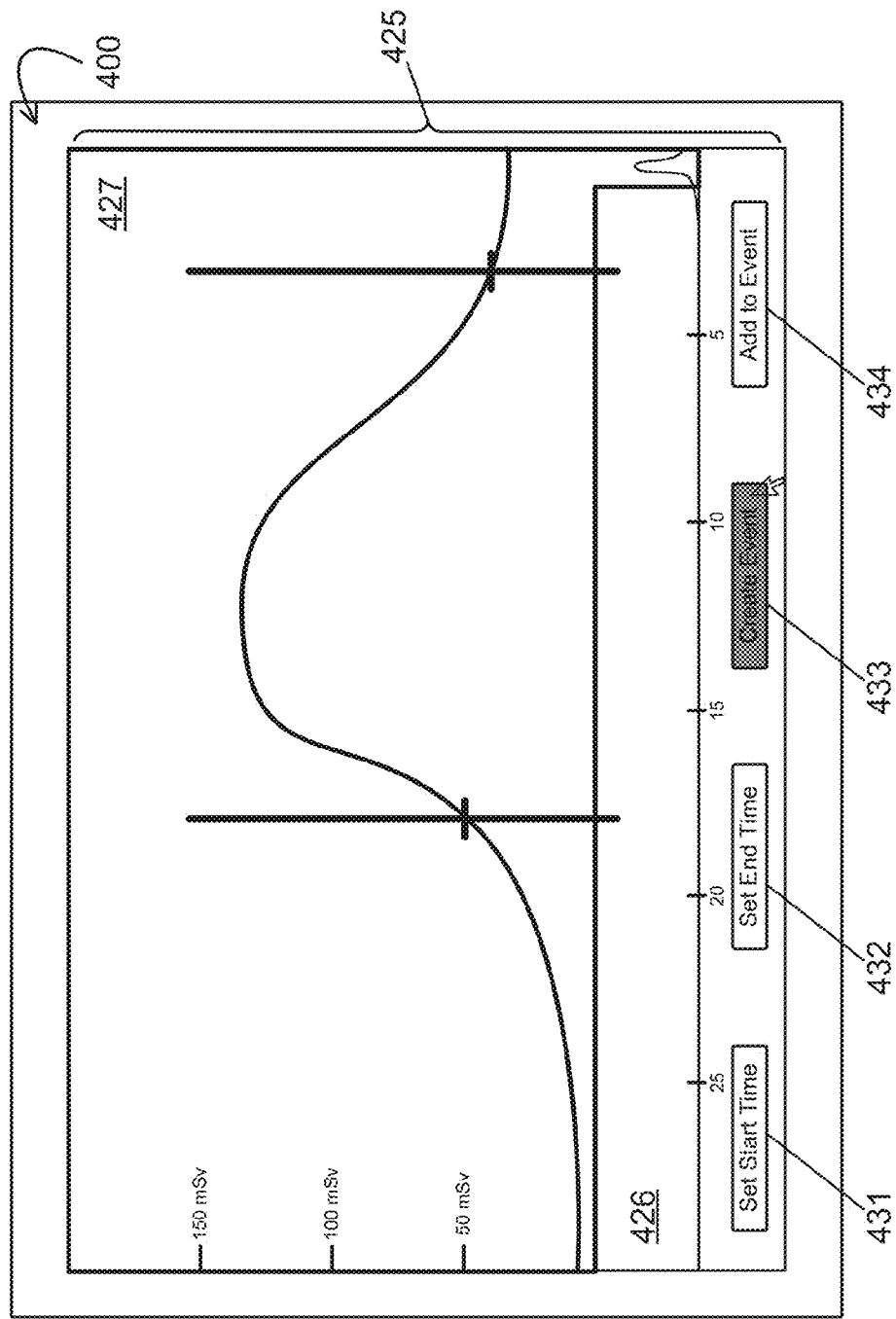

Referring now to FIG. 5G, the seventh instance 507 of the GUI 400 shows a user selecting an option for creating an event. Specifically, the user at this instance is selecting (e.g., by clicking) the user-selectable item 433 to create an event. For this example, an application that provides the GUI 400 creates an event associated with a sensor (e.g., a sensor in the sensors 110 that corresponds to the sensor representation 416d selected in the first instance 401) in response to the selection of the user-selectable item 433.

As mentioned above, an event may, in some embodiments, have a set of attributes (e.g., data values) associated with the event that may include a name attribute, start time attribute, and an end time attribute. In some such embodiments, the application creates an event by generating a data structure that includes a name attribute, start time attribute, and an end time attribute. The application may set the start time attribute as the time specified by the start time selector 510 and the end time attribute as the time specified by the end time selector 515. In some embodiments, the application automatically generates a name for the name attribute while, in other embodiments, the application prompts (e.g., via a pop-up window) a user to provide a name for the name attribute.

Figure 5H:
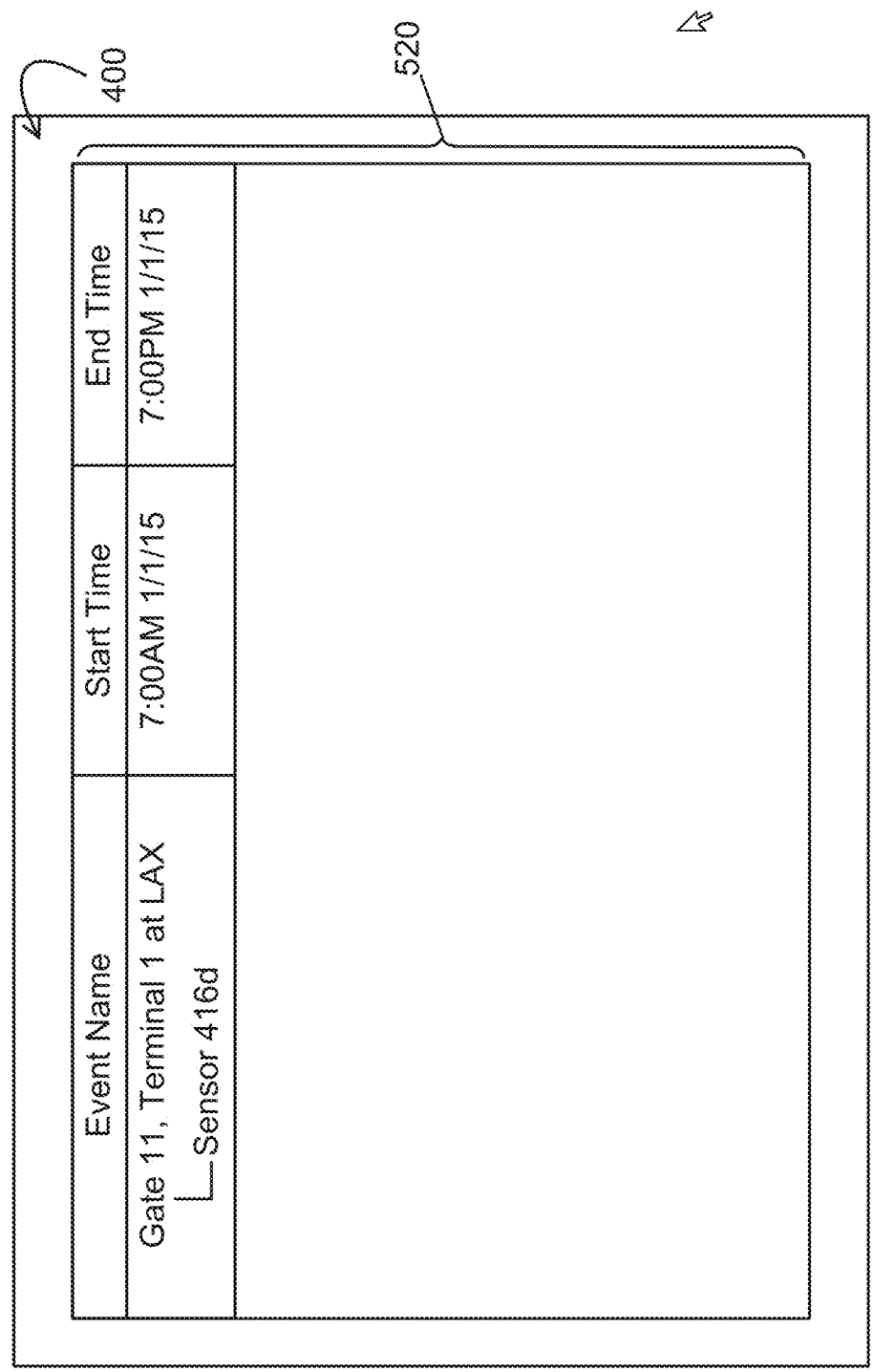

Referring now to FIG. 5H, the eighth instance 508 of the GUI 400 shows the GUI 400 an application that provides the GUI 400 creates an event in response to the selection of the user-selectable item 433 by a user. In this example, the application transitions from displaying the GUI 400 at the seventh instance 507 to displaying the GUI 400 at the eighth instance 508 upon creating the event. It is appreciated that the application may not transition to displaying the GUI 400 at the eighth instance 508 upon creating the event. For example, the application may continue to display the GUI 400 shown in the seventh instance 507 upon creating the event and may provide an option (e.g., a user-selectable item) for a user to manually navigate to the GUI 400 illustrated in the eighth instance 508.

As shown, the GUI 400 in the eighth instance 508 is displaying an event view pane 520. It is appreciated that the GUI 400 may display the event view pane 520 in a pop-up window that overlays some or all of the GUI 400 illustrated in the seventh instance 507. The event view pane 520 is for displaying the name of, the start time of, the end time of, and sensors associated with created events. It is appreciated that the event view pane 520 may show additional and/or different data regarding created events. As illustrated in FIG. 5H, the event created in the seventh instance 507 is displayed in the event view pane 520.

FIGS. 5A-5H illustrate creating an event having a start time and an end time. It is appreciated that an event may be created without setting an end time (e.g., the event may be ongoing) and that the user may later set the end time for the event (e.g., through an option that allows the user to edit the created event through a similar interface as that illustrated in the instances 5A-5G) and/or an application that provides the GUI 400 may automatically set the end time at a later time (e.g., the application automatically sets the end time when the application determines that a sensor reading of the sensor passes a threshold value, sensor readings from the sensor passes a predetermined threshold value for a predetermined period of time, a sensor reading of the sensor falls within a certain range of values, etc.). It is also appreciated that an event may be created without setting a start time and that the user may later set the start time for the event (e.g., through an option that allows the user to edit the created event through a similar interface as that illustrated in the instances 5A-5G) and/or an application that provides the GUI 400 may automatically set the start time at a later time.

In addition, FIGS. 5A-5H illustrate creating an event through a time chart tool according to some embodiments. It is appreciated that additional and/or different ways of creating events are possible in different embodiments. For instance, an application that provides the GUI 400 may allow a user to select (e.g., via selection box tool, a keyboard combination and/or shortcut, etc.) two or more sensor representations (e.g., the sensor representations 416c, 416d, and/or 416e) and provide the user with an option (e.g., through a pop-up menu, a drop-down menu, a keyboard shortcut, etc.) to create an event that includes the sensor associated with the selected sensor representations.

Figure 6A:
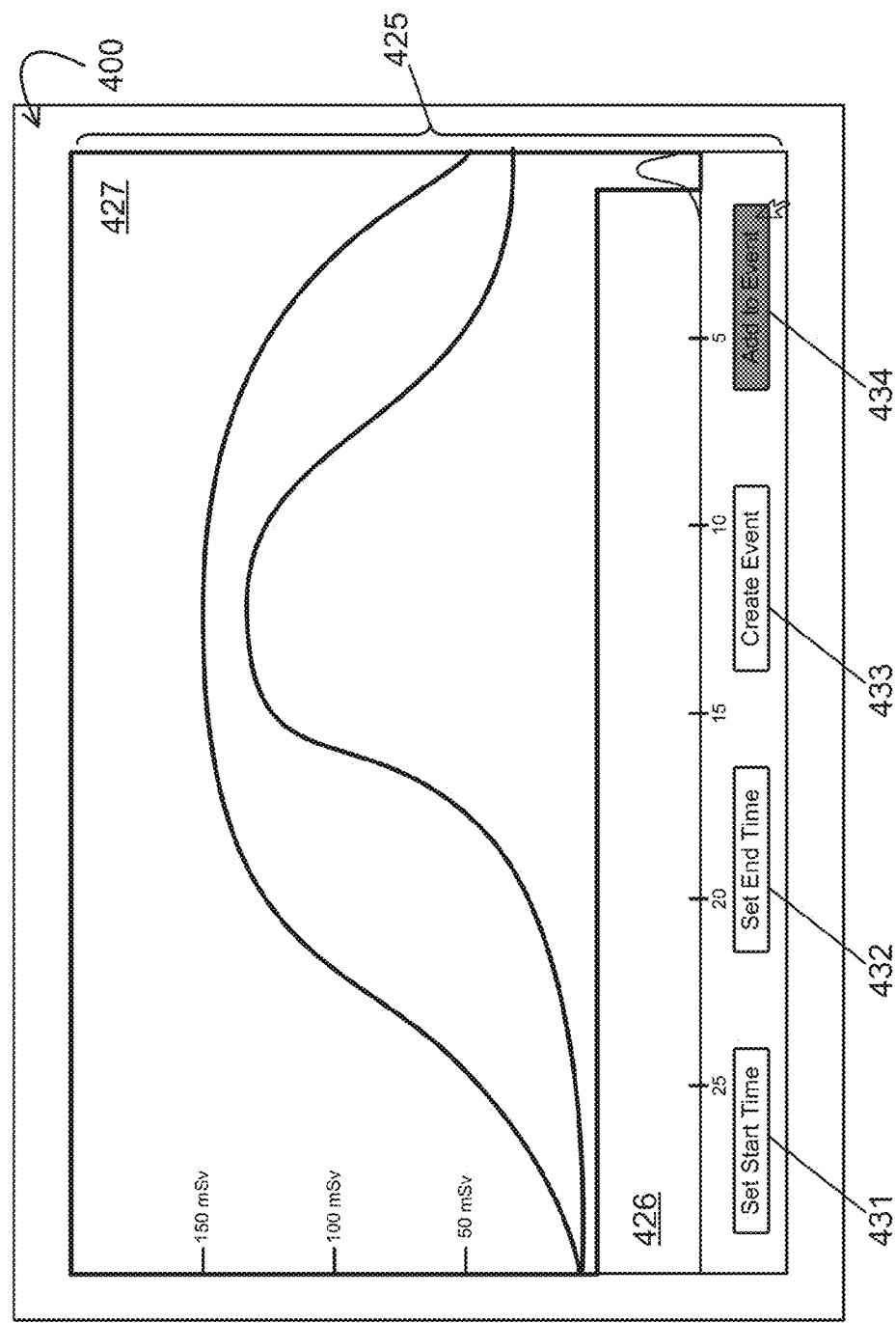
FIGS. 6A-6C show a GUI for modifying an event by adding a sensor to a number of sensors that were used for the event prior to modification in accordance with some embodiments.
Figure 6B:
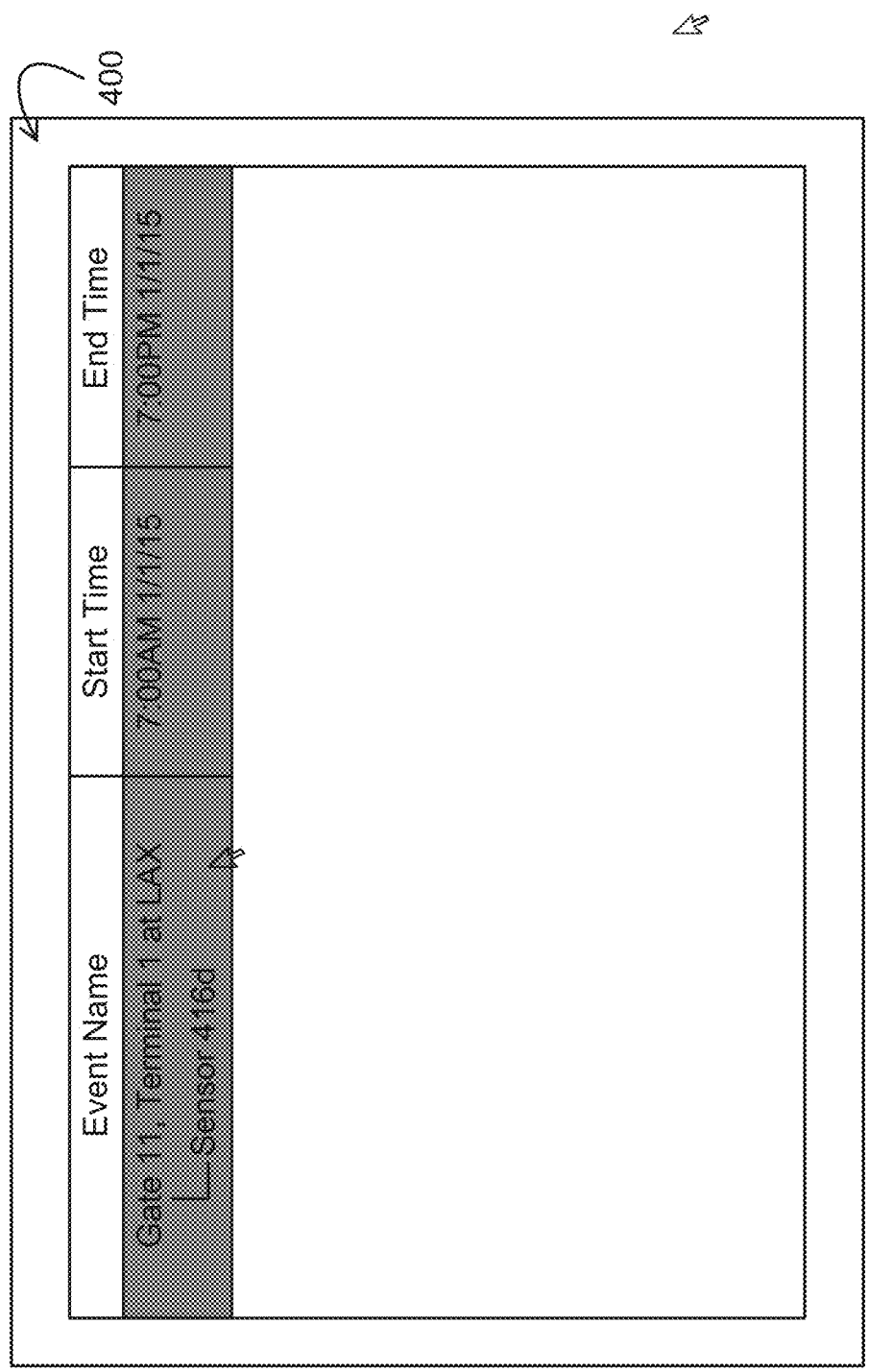
Figure 6C:
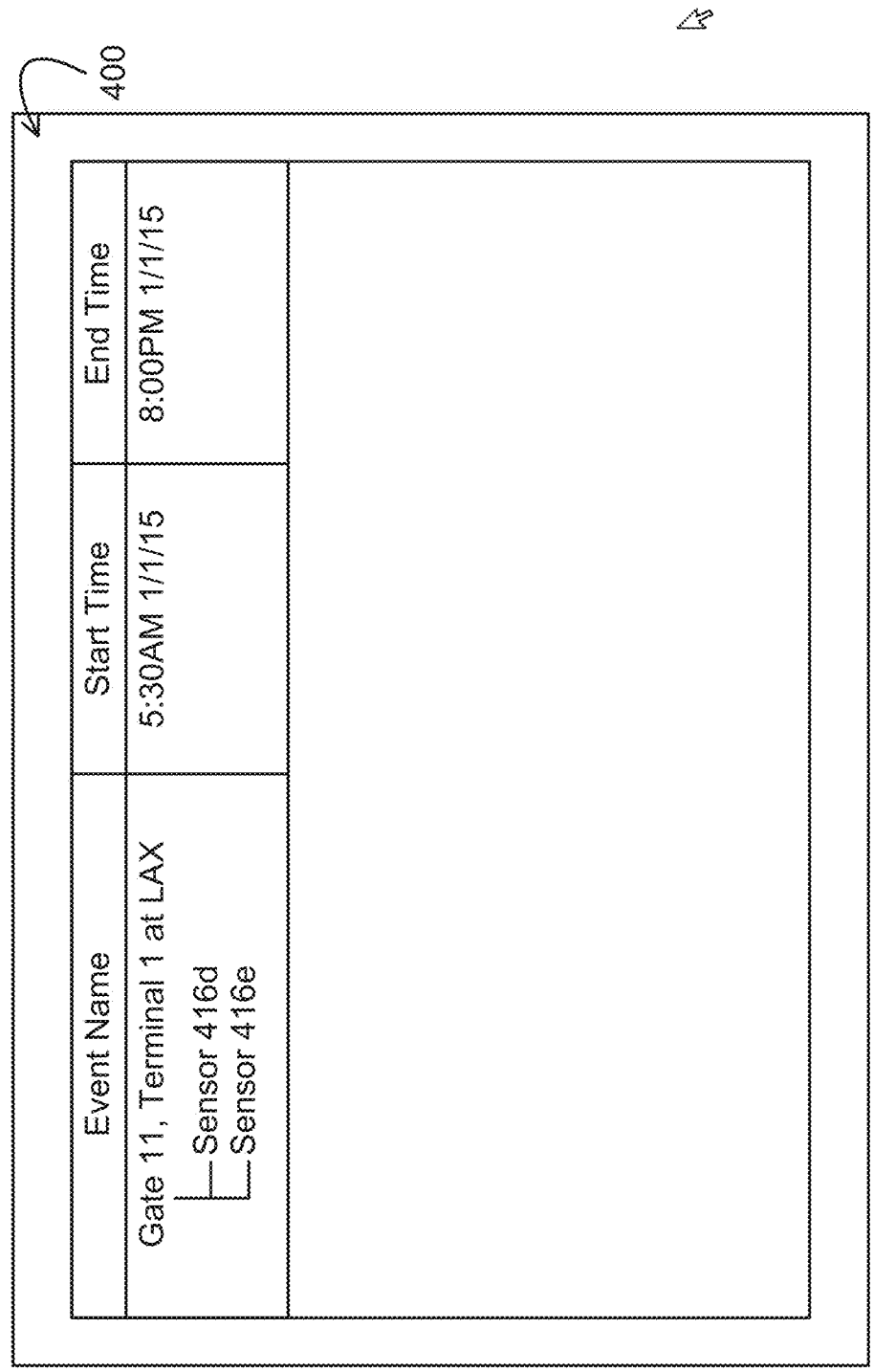

FIGS. 6A-6C show the GUI 400 at three different instances 601, 602, and 603 of modifying an event by adding a sensor to a number of sensors that were used for the event prior to modification in accordance with some embodiments. Referring now to FIG. 6A, the first instance 601 of the GUI 400 is similar to the first instance 501 except the first instance 601 shows the time chart tool 425 displaying sensor readings of a different sensor (e.g., a sensor in the sensors 110 that corresponds to the sensor representation 416e). The first instance 601 also shows a user selecting (e.g., by clicking) the user-selectable item 434 to modify a created event by adding a sensor to the created event.

Referring now to FIG. 6B, the second instance 602 of the GUI 400 shows the GUI 400 after a user selects the user-selectable item 434. For this example, an application that provides the GUI 400 transitions from displaying the GUI 400 at the first instance 601 to displaying the GUI 400 at the second instance 602 in response to the selection of the user-selectable item 434. As illustrated, the GUI 400 in the second instance 602 is displaying the event view pane 520, which shows the event created in the seventh instance 507. In this example, only one event is shown. However, in some embodiments, all created events may be displayed. As such, the user may select the event of interest to modify. The second instance 602 of the GUI 400 also shows the user selecting (e.g., by clicking) the event displayed in the event view pane 520 to modify the event created in the seventh instance 507 by adding the sensor to the event.

Referring now to FIG. 6C, the third instance 603 of the GUI 400 shows the GUI 400 after a user selects an event to which a sensor is added. In this example, an application that provides the GUI 400 transitions from displaying the GUI 400 at the second instance 602 to displaying the GUI 400 at the third instance 603 in response to the selection of the event displayed in the event view pane 520 of the second instance 602. In this example, the GUI 400 is displaying a new start time and a new end time for the event to which the sensor is added in the event view pane 520.

In some embodiments, the application that provides the GUI 400 automatically adjusts the start time and/or the end time of the event based on the start and end times of the sensors associated with the event, in response to a sensor added to the event. The application may adjust the start time of the event to the start time of the sensor associated with the event having the earliest start time. Additionally, the application may adjust the end time of the event to the end time of the sensor associated with the event having the latest end time.

It is appreciated that a user may specify a start time and/or an end time for a sensor in the same or similar manner as that shown in any of the FIGS. 5A-5F before adding the sensor to an existing event. When a sensor is added to an existing event and a start time and/or an end time of the sensor is not specified, the application may automatically determine a time for any unspecified times in the same manner described above and may use the determined time(s) in adjusting the start time and/or the end time of the event. In this example, a start time and an end time are not specified so the application automatically determines that the start time of the sensor selected in the second instance 602 as the time a sensor reading of the sensor passes 100 mSv and the end time of the sensor as the time a sensor reading of the sensor passes 50 mSv. Since the determined start time is earlier than the start time of the event, the application adjusts the start time of the event to the determined start time. Also, because the determined end time is later than the end time of the event, the application adjusts the end time of the event to the determined end time. As shown in the third instance 603, the application in this example updates the event view pane 520 with the adjusted start and end times.

FIGS. 6A-6C illustrate a user modifying an event by adding a sensor to an existing event. It is appreciated that, in some embodiments, the GUI 400 may allow a user to modify an event by removing a sensor from an existing event. In some such embodiments, the GUI 400 may provide a user-selectable item (e.g., a remove sensor button) for modifying an existing event by removing a sensor from the existing event. The GUI 400 may automatically adjust the start time and/or the end time of the existing event based on the start and end times of the sensors associated with the event, in response to a sensor removed from the existing event. Additionally, it is appreciated that the GUI 400 may allow a user to modify a start time and/or an end time of an event. For example, in some such embodiments, the GUI 400 may provide a user-selectable item (e.g., a modify time button) for modifying an existing event by editing a start time and/or end time of the existing event, provide an event view pane (e.g., the event view pane 520) in response to the selection of the user-selectable item, and provide a time chart tool and time selector tool(s) for editing the start time and/or end time in response to a selection of an existing event in the event view pane.

FIGS. 4B, 4C, 5A-5G, and 6A show a time chart tool for displaying sensor readings of a sensor in a timeline manner. It is appreciated that the time chart tool may present sensor readings in different ways. For instance, the time chart tool may present sensor readings in a tabular format, in some embodiments.

Figure 7:
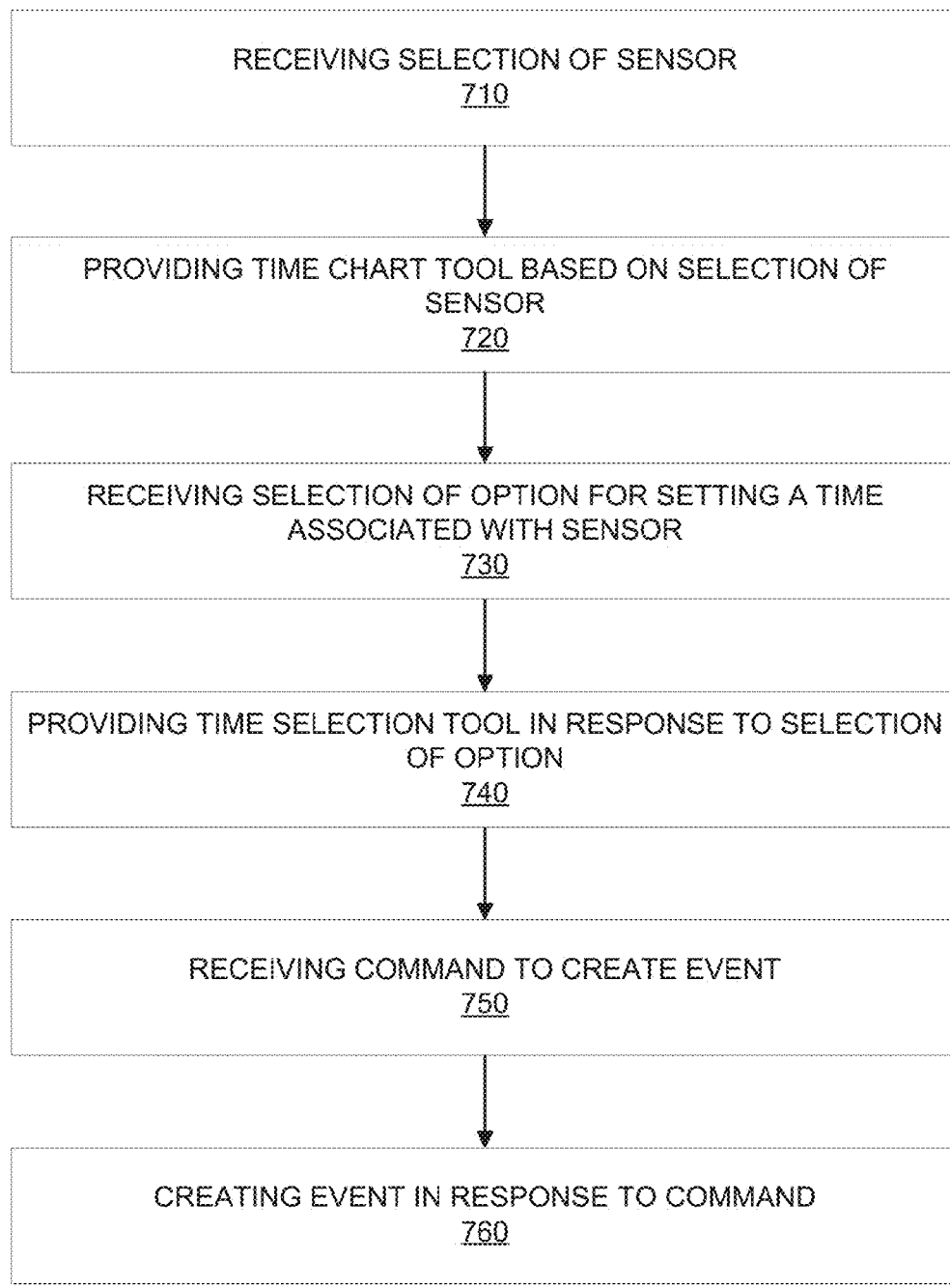
FIG. 7 shows a flow diagram for creating an event using a time chart tool in accordance with some embodiments.

FIG. 7 shows a flow diagram 700 for creating an event using a time chart tool in accordance with some embodiments. In some embodiments, a module (e.g., the visualization module 250) or an application that provides a GUI (e.g., the GUI 400) that includes a time chart tool performs the operations described in FIG. 7. At step 710, the module receives a selection of a sensor. Referring to FIG. 4A as an example, a module that provides the GUI 400 may receive a selection of a sensor representation (e.g., the sensor representation 416c, 416d, or 416e) from a user.

At step 720, the module provides a time chart tool based on the selection of the sensor. Referring to FIG. 4B as an example, a module that provides the GUI 400 may provide the time chart tool 425 in response to a selection of the sensor representation (e.g., the sensor representation 416c, 416d, or 416e) from the user.

At step 730, the module receives a selection of an option for setting a time (e.g., a start time, an end time) associated with the sensor. Referring to FIG. 5A as an example, a module that provides the GUI 400 may receive a selection of the user-selectable item 431 from a user to set a start time for a sensor. Referring to FIG. 5C as another example, a module that provides the GUI 400 may receive a selection of the user-selectable item 432 from a user to set an end time for a sensor.

At step 740, the module provides a time selection tool in response to the selection of the option for setting a time associated with a sensor. Referring to FIG. 5B as an example, a module that provides the GUI 400 may provide a time selection tool (e.g., the start time selector 510) for setting a start time for a sensor. Referring to FIG. 5D as another example, a module that provides the GUI 400 may provide a time selection tool (e.g., the end time selector 515) for setting an end time for a sensor.

As explained above, a module that provides a GUI (e.g., the GUI 400) that includes the option automatically determines, in some embodiments, a time (e.g., a start time or an end time) associated with the sensor. The module may use the time selection tool to indicate the determined time (e.g., by displaying the time selection tool specifying the determined time). In addition, a user may manually adjust the time associated with the sensor using the time selector tool. It is appreciated that a start time and an end time associated with the sensor may be specified.

At step 750, the module receives a command to create an event. Referring to FIG. 5G as an example, a module that provides the GUI 400 may receive a selection of the user-selectable item 433 from a user to create an event. At step 760, the module creates an event in response to the command. As mentioned above, a module that provides a GUI (e.g., the GUI 400) that includes a time chart tool may create an event by generating a data structure that includes a name attribute, start time attribute, and an end time attribute. The module may set the start time attribute as the time specified by the time selection tool(s) (e.g., the start time selector 510 and/or the end time selector 515). In some embodiments, the module may automatically generate a name for the name attribute while, in other embodiments, the application may prompt (e.g., via a pop-up window) a user to provide a name for the name attribute.

Figure 8:
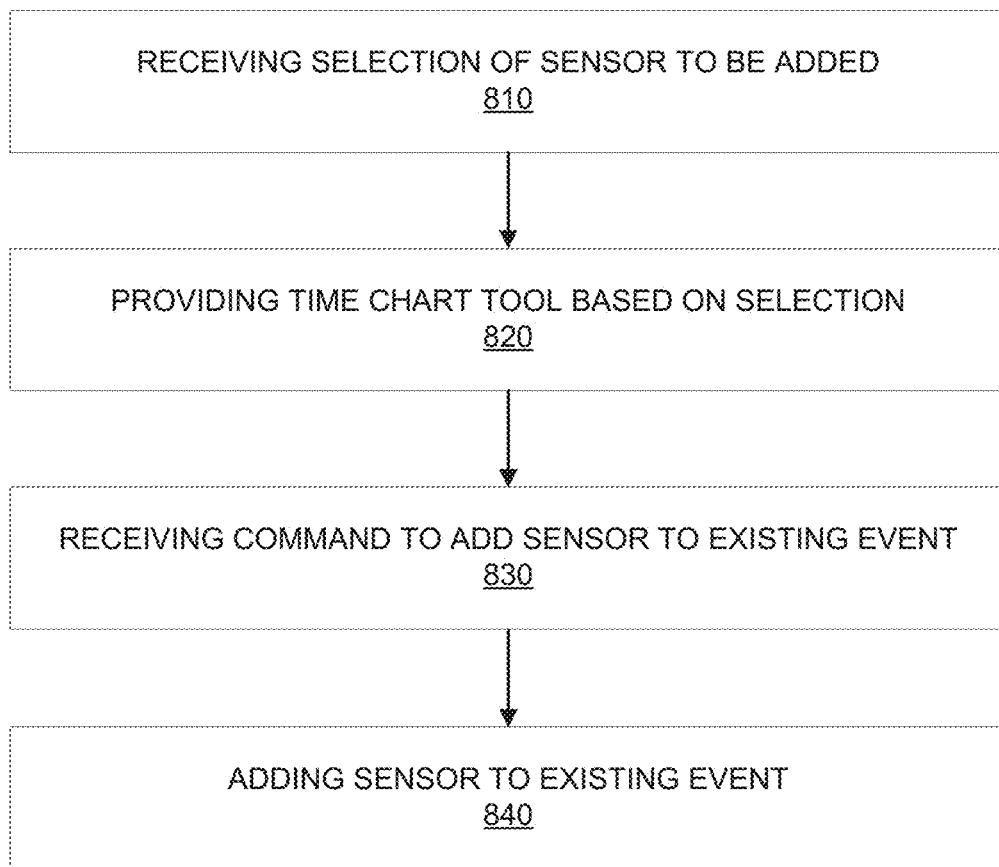
FIG. 8 shows a flow diagram for modifying an event by adding a sensor to a number of sensors that were used for the event prior to modification in accordance with some embodiments.

FIG. 8 shows a flow diagram 800 for modifying an event by adding a sensor to a number of sensors that were used for the event prior to modification in accordance with some embodiments. In some embodiments, a module (e.g., the visualization module 250) or an application that provides a GUI (e.g., the GUI 400) that includes a time chart tool performs the operations described in FIG. 8. At step 810, the module receives a selection of a sensor to be added. Referring to FIG. 6A as an example, a module that provides the GUI 400 may receive a selection of a sensor representation (e.g., the sensor representation 416c, 416d, or 416e) from a user.

At step 820, the module provides a time chart tool based on the selection of the sensor. Referring to FIG. 6A as an example, a module that provides the GUI 400 may provide the time chart tool 425 in response to a selection of the sensor representation (e.g., the sensor representation 416c, 416d, or 416e) from the user for the sensor to be added to an already created event.

At step 830, the module receives a command to add the selected sensor to an existing event. Referring to FIG. 6A as an example, a module that provides the GUI 400 may receive a selection of the user-selectable item 434 from a user to add the sensor to an existing event.

At step 840, the module adds the sensor to the existing event in response to the command. In some embodiments, the module adjusts the start time and the end time of the event upon adding the sensor to the existing event. The module may automatically adjust the start time and/or end time of the event based on the start and end times of the sensors associated with the event. For example, the module may adjust the start time of the event to the start time of the sensor associated with the event having the earliest start time and adjust the end time of the event to the end time of the sensor associated with the event having the latest end time. It is appreciated that a user may set a start time and/or end time in the same or similar manner described above by reference to steps 730 and 740 before adding the sensor to an existing event. In such instances, the module uses the specified start time and/or end time in adjusting the start time and/or end time of the event. When a sensor is added to an existing event and a start time and/or an end time of the sensor is not specified, the application may automatically determine a time for any unspecified times in the same manner described above and may use the determined time(s) in adjusting the start time and/or the end time of the event.

Figure 9:
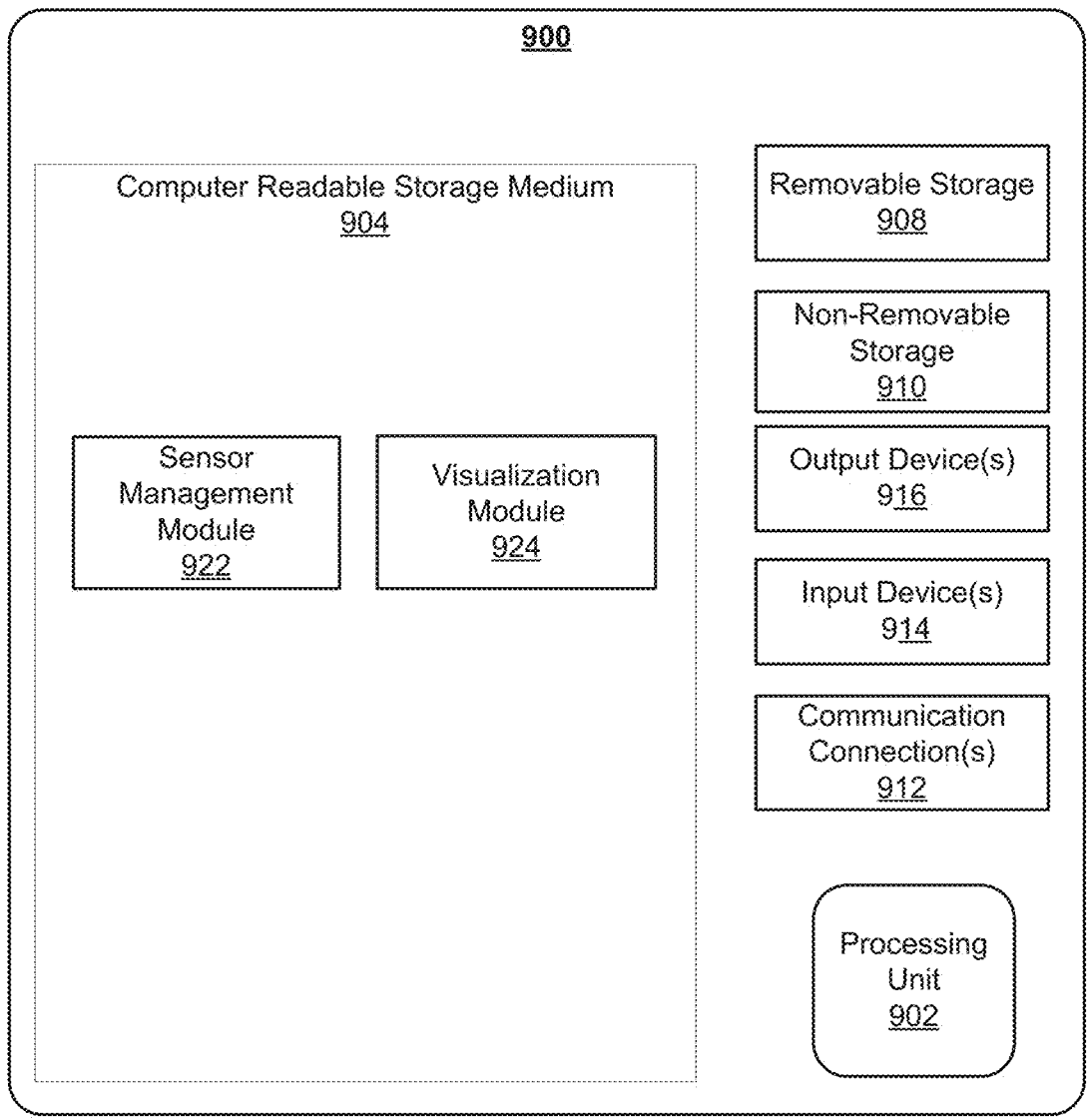
FIG. 9 shows a computer system in accordance with some embodiments.

Referring now to FIG. 9, a block diagram of a computer system in accordance with some embodiments is shown. With reference to FIG. 9, a system module for implementing embodiments includes a general purpose computing system environment, such as computing system environment 900. Computing system environment 900 may include, but is not limited to, servers, switches, routers, desktop computers, laptops, tablets, mobile devices, and smartphones. In its most basic configuration, computing system environment 900 typically includes at least one processing unit 902 and machine readable storage medium 904. Depending on the exact configuration and type of computing system environment, machine readable storage medium 904 may be volatile (such as RAM), non-volatile (such as ROM, flash memory, etc.) or some combination of the two. Portions of machine readable storage medium 904 when executed facilitate the forwarding/routing of network data through a management network, the management of backup data of nodes in the management network, the restoration of such nodes based on the backup data, the distribution of special link configuration information, and establishing special links based on the special link configuration information.

Additionally, in various embodiments, computing system environment 900 may also have other features/functionality. For example, computing system environment 900 may also include additional storage (removable and/or non-removable) including, but not limited to, magnetic or optical disks or tape. Such additional storage is illustrated by removable storage 908 and non-removable storage 910. Computer storage media includes volatile and nonvolatile, removable and non-removable media implemented in any method or technology for storage of information such as machine readable instructions, data structures, program modules or other data. Machine readable medium 904, removable storage 908 and nonremovable storage 910 are all examples of computer storage media. Computer storage media includes, but is not limited to, RAM, ROM, EEPROM, flash memory or other memory technology, expandable memory (e.g., USB sticks, compact flash cards, SD cards), CD-ROM, digital versatile disks (DVD) or other optical storage, magnetic cassettes, magnetic tape, magnetic disk storage or other magnetic storage devices, or any other medium which can be used to store the desired information and which can be accessed by computing system environment 900. Any such computer storage media may be part of computing system environment 900.

In some embodiments, computing system environment 900 may also contain communications connection(s) 912 that allow it to communicate with other devices. Communications connection(s) 912 is an example of communication media. Communication media typically embodies machine readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term machine readable media as used herein includes both storage media and communication media.

Communications connection(s) 912 may allow computing system environment 900 to communicate over various networks types including, but not limited to, fibre channel, small computer system interface (SCSI), Bluetooth, Zigbee, Z-Wave, Ethernet, Wi-fi, Infrared Data Association (IrDA), Local area networks (LAN), Wireless Local area networks (WLAN), wide area networks (WAN) such as the internet, serial, and universal serial bus (USB). It is appreciated the various network types that communication connection(s) 912 connect to may run a plurality of network protocols including, but not limited to, transmission control protocol (TCP), user datagram protocol (UDP), internet protocol (IP), real-time transport protocol (RTP), real-time transport control protocol (RTCP), file transfer protocol (FTP), and hypertext transfer protocol (HTTP).

In further embodiments, computing system environment 900 may also have input device(s) 914 such as keyboard, mouse, a terminal or terminal emulator (either connected or remotely accessible via telnet, SSH, http, SSL, etc.), pen, voice input device, touch input device, remote control, etc. Output device(s) 916 such as a display, a terminal or terminal emulator (either connected or remotely accessible via telnet, SSH, http, SSL, etc.), speakers, light emitting diodes (LEDs), etc. may also be included. All these devices are well known in the art and are not discussed at length.

In one embodiment, machine readable storage medium 904 includes a sensor management module 922 and a visualization module 924. The sensor management module 922 is operable to manage (e.g., in the same or similar manner as the sensor management module 210) sensors in a sensor-based detection system. The visualization module 924 may be used to provide (e.g., in the same or similar manner as the visualization module 250) GUIs (e.g., the GUI 400 illustrated in FIGS. 4A-4C, 5A-5H, and 6A-6C) for creating events, modifying (e.g., adding sensors to, removing sensors from, etc) existing events, displaying sensor readings of sensors, etc.

It is appreciated that implementations according to some embodiments that are described with respect to a computer system are merely exemplary and not intended to limit the scope of the embodiments. For example, some embodiments may be implemented on devices such as switches and routers, which may contain application specific integrated circuits (ASICs), field programmable gate arrays (FPGAs), etc. It is appreciated that these devices may include a machine readable medium for storing instructions for implementing methods according to flow diagrams 500 and 600.

Figure 10:
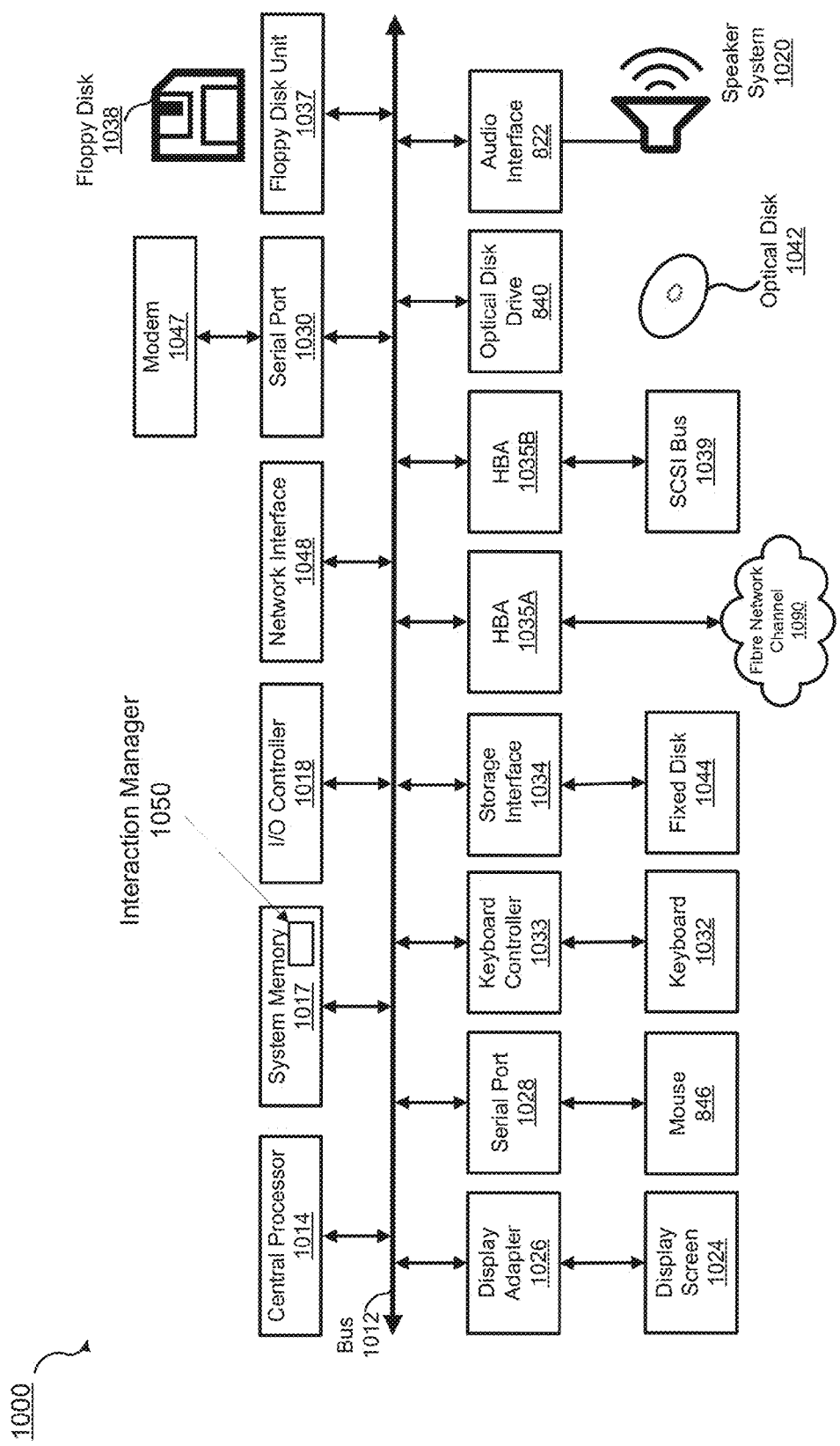
FIG. 10 shows a block diagram of a computer system in accordance with some embodiments.

Referring now to FIG. 10, a block diagram of another exemplary computer system in accordance with some embodiments is shown. FIG. 10 depicts a block diagram of a computer system 1010 suitable for implementing the present disclosure. Computer system 1010 includes a bus 1012 which interconnects major subsystems of computer system 1010, such as a central processor 1014, a system memory 1017 (typically RAM, but which may also include ROM, flash RAM, or the like), an input/output controller 1018, an external audio device, such as a speaker system 1020 via an audio output interface 1022, an external device, such as a display screen 1024 via display adapter 1026, serial ports 1028 and 1030, a keyboard 1032 (interfaced with a keyboard controller 1033), a storage interface 1034, a floppy disk drive 1037 operative to receive a floppy disk 1038, a host bus adapter (HBA) interface card 1035A operative to connect with a Fibre Channel network 1090, a host bus adapter (HBA) interface card 1035B operative to connect to a SCSI bus 1039, and an optical disk drive 1040 operative to receive an optical disk 1042. Also included are a mouse 1046 (or other point-and-click device, coupled to bus 1012 via serial port 1028), a modem 1047 (coupled to bus 1012 via serial port 1030), and a network interface 1048 (coupled directly to bus 1012). It is appreciated that the network interface 1048 may include one or more Ethernet ports, wireless local area network (WLAN) interfaces, Bluetooth interfaces, Zigbee interfaces, Z-Wave interfaces, etc., but are not limited thereto. System memory 1017 includes an interaction manager 1050 which is operable to provide tools to a user for interacting with sensor-based detections systems. According to one embodiment, the interaction manager 1050 may include other modules for carrying out various tasks. For example, the interaction manager 1050 may include the sensor management module 922 and the visualization module 924, as discussed with respect to FIG. 9 above. It is appreciated that the interaction manager 1050 may be located anywhere in the system and is not limited to the system memory 1017. As such, residing of the interaction manager 1050 within the system memory 1017 is merely exemplary and not intended to limit the scope of the embodiments. For example, parts of the interaction manager 1050 may reside within the central processor 1014 and/or the network interface 1048 but are not limited thereto.

Bus 1012 allows data communication between central processor 1014 and system memory 1017, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 1010 are generally stored on and accessed via a machine readable medium, such as a hard disk drive (e.g., fixed disk 1044), an optical drive (e.g., optical drive 1040), a floppy disk unit 1037, or other storage medium. Additionally, applications can be in the form of electronic signals modulated in accordance with the application and data communication technology when accessed via network modem 1047 or interface 1048.

Storage interface 1034, as with the other storage interfaces of computer system 1010, can connect to a standard machine readable medium for storage and/or retrieval of information, such as a fixed disk drive 1044. Fixed disk drive 1044 may be a part of computer system 1010 or may be separate and accessed through other interface systems. Network interface 1048 may provide multiple connections to other devices. Furthermore, modem 1047 may provide a direct connection to a remote server via a telephone link or to the Internet via an internet service provider (ISP). Network interface 1048 may provide one or more connection to a data network, which may include any number of networked devices. It is appreciated that the connections via the network interface 1048 may be via a direct connection to a remote server via a direct network link to the Internet via a POP (point of presence). Network interface 1048 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 10 need not be present to practice the present disclosure. The devices and subsystems can be interconnected in different ways from that shown in FIG. 10. The operation of a computer system such as that shown in FIG. 10 is readily known in the art and is not discussed in detail in this application. Code to implement the present disclosure can be stored in machine-readable storage media such as one or more of system memory 1017, fixed disk 1044, optical disk 1042, or floppy disk 1038. The operating system provided on computer system 1010 may be MS-DOS®, MS-WINDOWS®, OS/2®, UNIX®, Linux®, or any other operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The foregoing description, for purpose of explanation, has been described with reference to specific embodiments. However, the illustrative discussions above are not intended to be exhaustive or to limit the embodiments disclosed. Many modifications and variations are possible in view of the above teachings.

What is claimed is:

1. A system comprising:
    a sensor management module configured to manage a plurality of sensors, wherein the plurality of sensors is configured to measure values associated with inputs therein; and
    a visualization module configured to provide a graphical user interface (GUI) for modifying an already created event, wherein the already created event is associated with a first subset of the plurality of sensors, wherein the already created event has a start time and an end time,
    and wherein the modifying is associated with changing the first subset and to form a second subset of the plurality of sensors, and wherein the start time and the end time are modified in response to the modifying of the already created event.

2. The system as described in claim 1, wherein modifying the event comprises adding a sensor to the first subset of the plurality of sensors to form the second subset of the plurality of sensors.

3. The system as described in claim 2, wherein the start time of the already created event is modified to a start time associated with the added sensor when the start time associated with the added sensor is a time later than the start time of the already created event.

4. The system as described in claim 2, wherein the start time of the already created event is modified to a start time associated with the added sensor when the start time associated with the added sensor is a time later than the start time of the already created event.

5. The system as described in claim 1, wherein modifying the event comprises removing a sensor from the first subset of the plurality of sensors to form the second subset of the plurality of sensors.

* * * * *